United States Patent [19]
Mattox

[11] Patent Number: 5,404,321
[45] Date of Patent: Apr. 4, 1995

[54] COMPUTER SYSTEM AND METHOD FOR MODIFYING AND ENHANCING THE BUILT-IN PROGRAMS OF A COMPUTER

[76] Inventor: Jeffrey Mattox, 2614 Prairie Rd., Madison, Wis. 53711

[21] Appl. No.: 64,654

[22] Filed: May 21, 1993

[51] Int. Cl.⁶ ................. G06F 3/03; G06F 15/02; G09G 3/00
[52] U.S. Cl. .............. 364/709.01; 364/928.6; 364/928.3; 364/948.1; 364/DIG. 2; 364/234.3; 364/232.9; 364/DIG. 1; 364/189; 395/250; 395/375; 341/23; 345/172
[58] Field of Search ............ 364/189, 168, 709; 341/23; 345/172

[56] References Cited

U.S. PATENT DOCUMENTS

| | | | |
|---|---|---|---|
| 4,200,913 | 4/1980 | Kuhar et al. | 341/23 |
| 4,431,988 | 2/1984 | Molusis et al. | 345/168 |
| 4,464,070 | 8/1984 | Hanft et al. | 400/98 |
| 4,523,298 | 6/1985 | Sakurai | 341/23 |
| 4,547,860 | 10/1985 | Lapeyre | 364/709.16 |
| 4,650,349 | 3/1987 | Westreich | 400/98 |
| 4,680,725 | 7/1987 | Lapeyre | 364/709 |
| 4,796,008 | 1/1989 | Haneda | 349/711 |
| 4,891,786 | 1/1990 | Goldwasser . | |
| 4,937,778 | 6/1990 | Wolf et al. | 395/250 |
| 5,070,478 | 12/1991 | Abbott | 364/419 |

Primary Examiner—Parshotam S. Lall
Assistant Examiner—Timothy Lee Philipp
Attorney, Agent, or Firm—Jacobson, Price, Holman & Stern

[57] ABSTRACT

A system and method for modifying or enhancing the operation of a palmtop computer which intercepts keystrokes from the keyboard, reads the keyboard characters corresponding to the keystrokes, reads display data, and based on the current state of the display, the sequence of previous keystrokes, and other variables, either delivers the current keystroke character to the application program without change, with additional or replacement characters, or dumps the current keystroke character. The system and method alters the "look-and-feel" of the computer by providing easier ways to interact by the keyboard with the built-in application programs. The system and method may monitor display data between keystrokes and determine the identity of the particular active application program based on what the display screen is displaying. Keystrokes and the display state are monitored to determine if there are additional functions to be executed for the active application program. In some instances, characters are written directly to the display to change the look of the display screen for the user to see before any keystroke is made. In some instances, the audible alert signal is monitored and audible alert signal requests are intercepted.

8 Claims, 18 Drawing Sheets

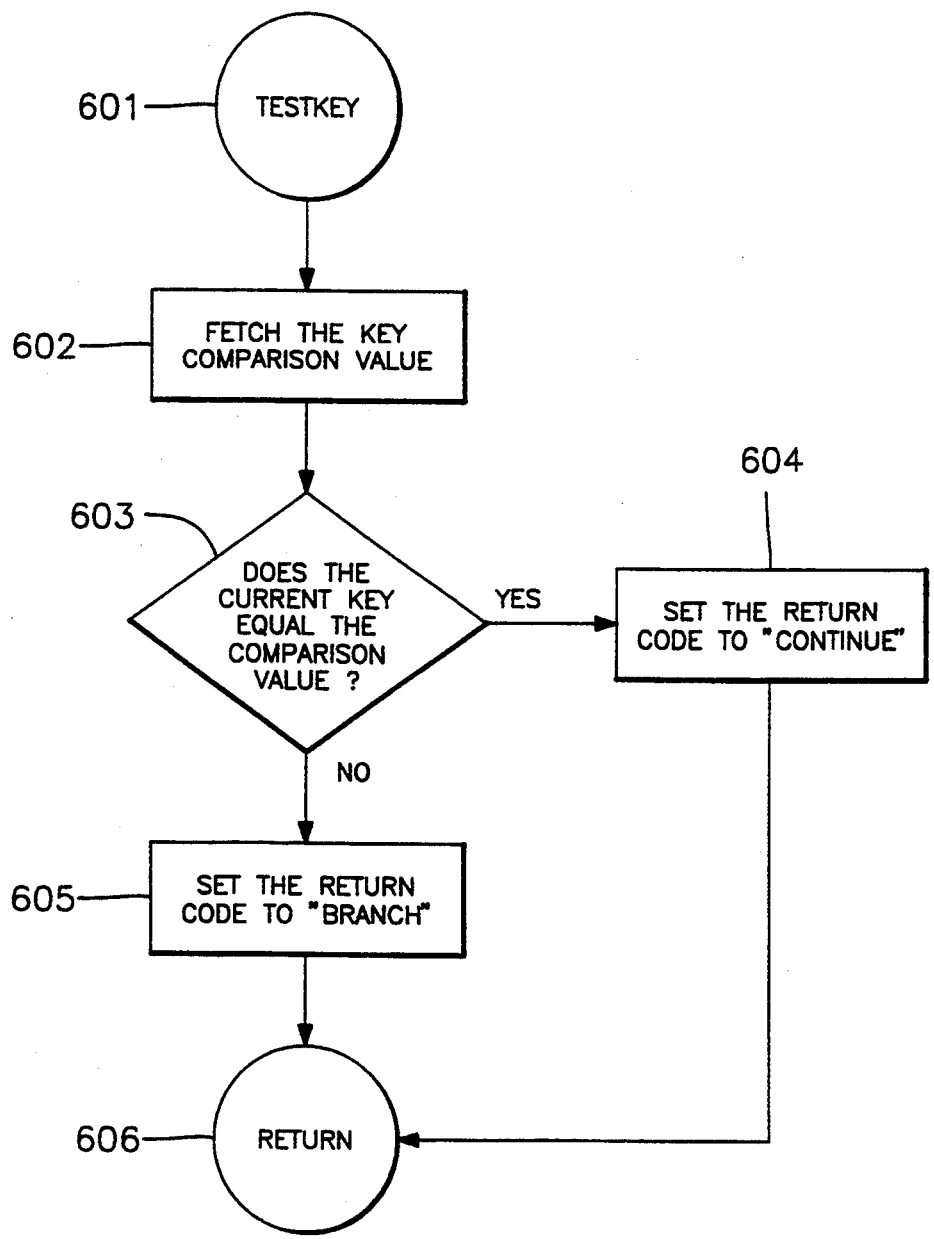

INTERPRETER CODE DATA VALUES FOR A PREVKEY COMMAND

| PREVKEY COMMAND | BRANCH ADDRESS IF NO MATCH | KEY COMPARISON VALUE |

(16 BITS EACH)

INTERPRETER CODE DATA VALUES FOR A TESTDSPL COMMAND

COMPUTER SYSTEM AND METHOD FOR MODIFYING AND ENHANCING THE BUILT-IN PROGRAMS OF A COMPUTER

BACKGROUND OF THE INVENTION

The present invention relates to a system and method for changing the "look-and-feel" of a computer, and more specifically to a method for modifying and enhancing the operations of a palmtop computer.

Recent advances in computer technology have resulted in increasingly smaller computers, such as the "laptop" and the still smaller "palmtop" computers. As compared with desktop computers, such as well known PC's (personal computers), a palmtop does not have a disk drive and currently has one-half to four megabytes of RAM. As a result, the "built-in" programs which encompass the basic functionality of the device, are contained in ROM. Palmtop computers are usually sized to fit in a coat or shirt pocket.

Palmtop computers use the "built-in" programs, which include a number of pre-programmed functions, to permit users to organize their business and personal matters. In this regard, palmtop computers are also known as personal data assistants (PDA'S). The palmtop is a small battery-powered computer having an integrated integral keyboard and display. Examples of the built-in programs include appointment book/calendar; phone book, contact list, or data base; calculator or spreadsheet; data filer; text creator and editor; communications controller; games; and infrared remote controller. These built-in programs are typically stored in the ROM of the machine so that the user does not have to load individual programs. However, the palmtop computer enables the addition of certain add-in programs through insertion of memory expansion cards or by downloading via a serial communications port.

One example of a palmtop computer (to which the invention described hereinbelow has particular applicability) is the Hewlett-Packard HP 95LX ("95LX"). The HP 95LX includes a display that is 16 lines long by 40 characters in length. The keyboard of the 95LX includes a set of alphabetic keys, ten numeric keys, ten function keys, seven application program keys, four "shift" keys, and a few miscellaneous keys.

A major drawback of the palmtop computer lies in its small keyboard. The small keyboard, and the limited number of keys, makes it difficult to type rapidly. In fact, it is virtually impossible to touch-type. Consequently, operations such as typing a capital letter which require two distinct keystrokes, are quite frustrating. In addition, the palmtop is frequently used without the benefit of a flat, stable surface. Therefore, one or both hands are often used to cradle the machine. This makes it more difficult to reach certain keys, and particularly difficult to push more than one key at a time.

The function keys of the palmtop computer are used during the running of the application programs to initiate special functions (text search, "cut & paste", etc.). Some functions require the user to navigate through a set of menus. For example, to save a modified text file and quit the 95LX text editor called "Memo", at least five and perhaps as many as seven keystrokes are required. The more keystrokes needed, the more time-consuming and frustrating it can be to operate the computer. Moreover, in the 95LX, there are instances when it is necessary to quit all of the currently open application programs before certain other programs can be run. Thus, each active program must be quit in sequence until all have been exited. Again, this is a laborious task, because several sequences of keystrokes are needed.

Further, many of the built-in application programs require different keystroke inputs for similar functions. The user must hesitate and think about the proper actions to take to initiate certain functions, depending on the prompts and displays encountered when, for example, trying to save a file. Still another problem area is accommodating individual tastes and habits. Some people can tolerate the small keyboard while others find the placement of the keys annoying.

Other disadvantages to palmtop computers are that some features that should have been provided as "built-in" features, were omitted entirely. For example, the 95LX has restrictions on the size of the phone book files and appointment notes that limit the usefulness of the machine for many people. Moreover, the phone book could be used as a generalized data base because it automatically sorts entries, but the field names are fixed as "Name", "Phone", and "Address".

SUMMARY OF THE INVENTION

The present invention relates to a system and method for modifying or enhancing the operation of a palmtop computer. The system and method, sometimes referred to herein as "Companion", intercepts keystrokes from the keyboard, reads the keyboard characters corresponding to the keystrokes, reads display data, and based on the current state of the display, the sequence of previous keystrokes, and other variables, either delivers the current keystroke character to the application program without change, with additional or replacement characters, or dumps the current keystroke character.

The Companion alters the "look-and-feel" of the computer by providing easier ways to interact, via the keyboard, with the application programs. The Companion functions may be activated or deactivated by the user at "boot" time by specifying which Companion functions are to be made active or inactive in a user configuration file.

Generally, the Companion monitors display data between every keystroke and determines the identity of the particular active application program based on what the display screen is displaying. Keystrokes and the display state are monitored to determine if there is a Companion function to be executed for the active application program. In some instances, a stream of characters simulating keystroke input will be sent to the display to change the "look" of the display screen before any keystroke is made.

It is a general goal of all of the Companion functions to lessen the number of keystrokes required to execute a certain feature in an application program. This is achieved by recognizing the active application program, the current display state, and previous keystroke characters, thus determining the function the user is trying to achieve in the application program, and supplying the subsequent keystrokes (without the user manually striking the keys) to the application program to implement that function.

There are several Companion functions described herein which are representative of the types of special functions that may be provided to enhance operation of the computer. One Companion function provides a "fast save and exit" feature to terminate an application program and save the current file. Another Companion function provides a "mass exit" feature in which the active and previously active application programs are exited, and all files that were worked on in each application program are saved. Still another Companion function is an automatic capitalization feature in which a shift key need not be hit to capitalize certain letters in sentences while the characters are being typed. Yet another Companion function is a "double-click" feature in which a double-press of a key will automatically send the shifted version of that keystroke character to the application program.

It is a primary object of the present invention to make a palmtop computer easier to operate.

It is still another object of the present invention to enhance and modify the operation of a palmtop computer.

It is yet another object of the present invention to enhance and modify the operation of a palmtop computer by providing shortcuts to keyboard operation of certain application programs that are stored in the palmtop computer.

The above and other objects and advantages will become more readily apparent when reference is made to the following description taken in conjunction with the accompanying drawings.

BRIEF DESCRIPTION OF THE DRAWINGS

FIGS. 9A, 9B, 10A, 10B, 11A, and 11B are flowchart and command code diagrams of machine-code routines in accordance with the present invention.

DETAILED DESCRIPTION OF THE DRAWINGS

Figure 1:
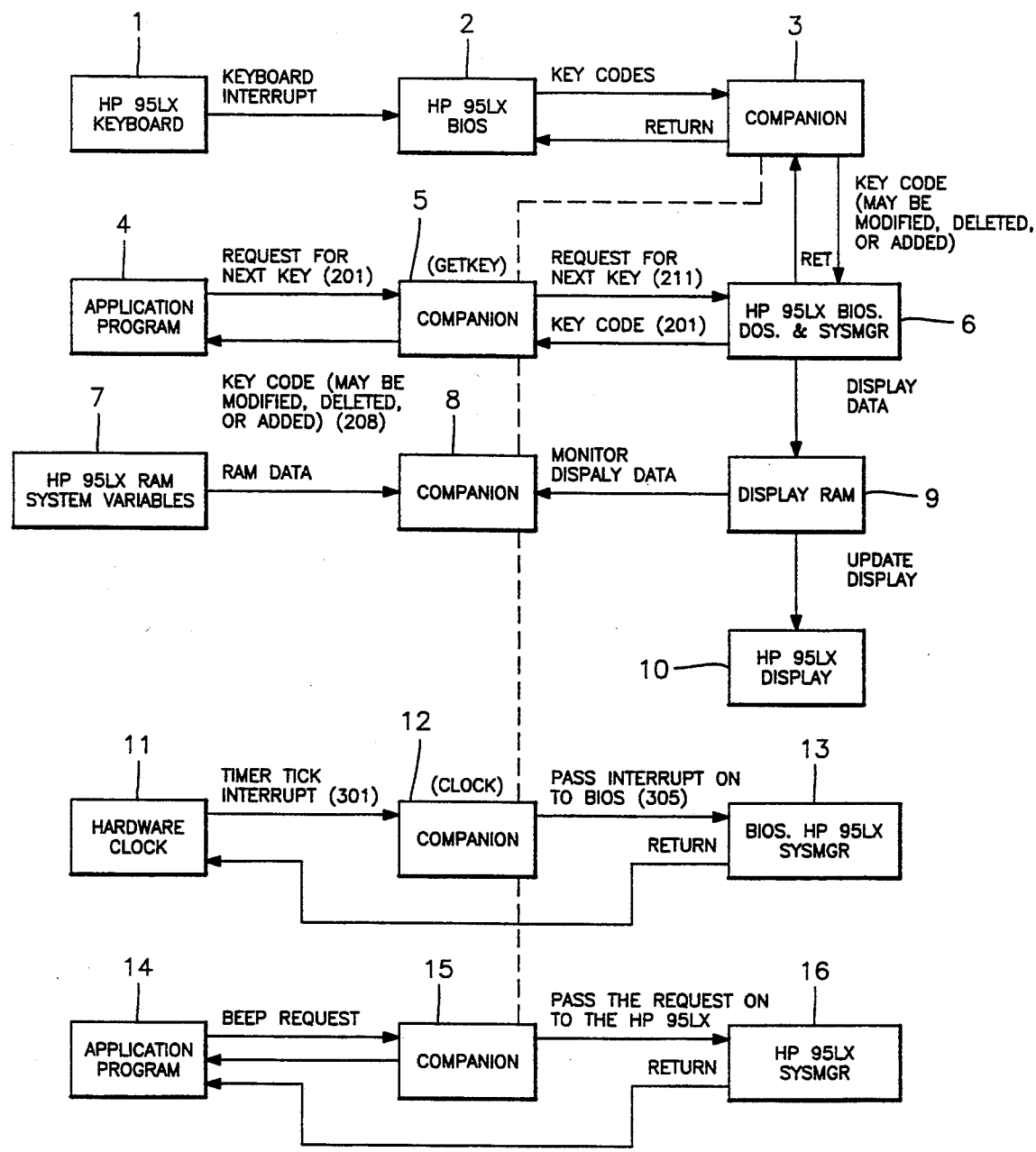
FIG. 1 is a block diagram illustrating how the system and method of the present invention interacts with various components in the palmtop computer.

The present invention relates to a method for modifying and enhancing the functionality of a computer, and particularly a palmtop computer. In this regard, the invention is concerned with making a palmtop computer easier to use, despite the disadvantages associated with its small, hard-to-use keyboard. In so doing, the present invention also makes the computer faster in user-interaction, and also changes the "look-and-feel" of the computer by altering certain display screens of certain stored application programs. The term "stored application programs" include built-in programs stored in ROM and add-in programs which are stored in RAM.

Though the present invention is described in conjunction with a palmtop computer, it may also be useful in a laptop or even desktop personal computer. Nevertheless, the present invention finds particular utility in palmtop computers, which have minimal built-in programs, and which are awkward to operate by keyboard input.

The following description of the specific embodiment of the present invention is made with specific reference to the Hewlett-Packard HP 95LX palmtop computer, and the computer program listing as found in this Patent's application file, is written for use in the 95LX. In this regard, the Appendix of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever. Further, it is to be understood that the concepts of the present invention may readily be applied to computers made by other manufacturers and certainly newer versions of the 95LX.

The HP 95LX user manuals, which are readily available, may be referred to for a more complete understanding of the 95LX. In this regard, the HP 95LX user manuals are incorporated herein by reference. Also incorporated herein by reference is a document entitled "95BUDDY, A Keyboard Companion for the HP 95LX Palmtop Computer", Oct. 31, 1992, by Jeffrey Mattox, the inventor of the present invention.

Several terms will be referred to throughout this description. Some of these terms have meanings which are well known in the art, while others do not. Accordingly, reference should be made to the table below for those which do not have conventional meanings.

Built-in application program:
  A computer program that comes with the computer. In the HP 95LX palmtop computer and other similar machines, the programs are stored in ROM.

BIOS:
  The basic input/output (I/O) system of the computer. It includes a part of the built-in computer program that provides fundamental I/O services such as character I/O (keyboard and display) and disk I/O (disk drive read and write).

DOS:
  The operating system which provides higher-level functions than the BIOS, such as memorizing files and other tasks. Together, the BIOS and DOS define the operating environment of the computer.

"Active" application program:

The active application program (built-in or add-in) is the application program that is currently visible on the display screen. When an application program is started, it becomes active. When an application program is quit, one of the application programs running previously becomes the active application program. Keystrokes are delivered to the active application program and the display is controlled by the active application program.

Interpreter:

A program that reads a list of codes that indicate commands to be executed. The commands themselves are not executed. Rather, the interpreter calls a machine-language routine that executes the desired operation.

Interpreter code:

The list of codes used by an interpreter. Each code represents a command code (and optional command arguments) that specify a particular operation. A command code may simply be an address value representing the memory location of a machine-language routine that should be called to implement the desired function.

Interpreter dispatcher:

The machine-language portion of the interpreter that fetches an interpreter command code and makes the decision as to which machine-language routine to call to implement the command. Normally, the dispatcher fetches sequential codes, but the dispatcher may alter the control flow based on the outcome of executing certain commands.

Machine-Language:

Codes representing the instructions that are understood by the computer. Examples include loading an internal register or adding a value to a currently-stored register value.

Machine-language routine:

Any sequence of machine-language instructions. In the present invention, machine-language routines are used to implement certain functions for the interpreter. Examples include testing for a particular keystroke from the keyboard or adding a character or string to the display.

Mainline code:

The collective sequence of interpreter codes that are used each time a key is pressed. In the present invention, the exact codes that are used depends on the particular key and the current machine mode. Not all the codes are used for each key. The mainline code implements the Companion functions and controls high level sequencing.

Current display status:

The data currently being displayed on the display screen indicates the current display state. The program and a program mode identity of the active built-in application is determined on the basis of the current display state. However, there may be several different display states for a particular application program.

Program mode:

A particular display screen of a built-in application program that is dedicated to a particular function in that application program. There may be many program modes in a built-in application program.

Buffer:

An area of memory that is allocated or set aside and may contain a sequence of characters or other data, waiting to be processed in some fashion.

Keystroke:

The occurrence of pressing a key on the keyboard.

Character:

What is generated by pressing a key on the keyboard. Each keystroke has a corresponding character and hence a corresponding ASCII representation.

Throughout this description, the present invention will be generally referred to as the "Companion". (The commercial product name as applicable to the HP 95LX palmtop computer, is "95Buddy".) It is to be understood, that the Companion relates to a system and method involving keyboard and display interaction.

Figure 2:
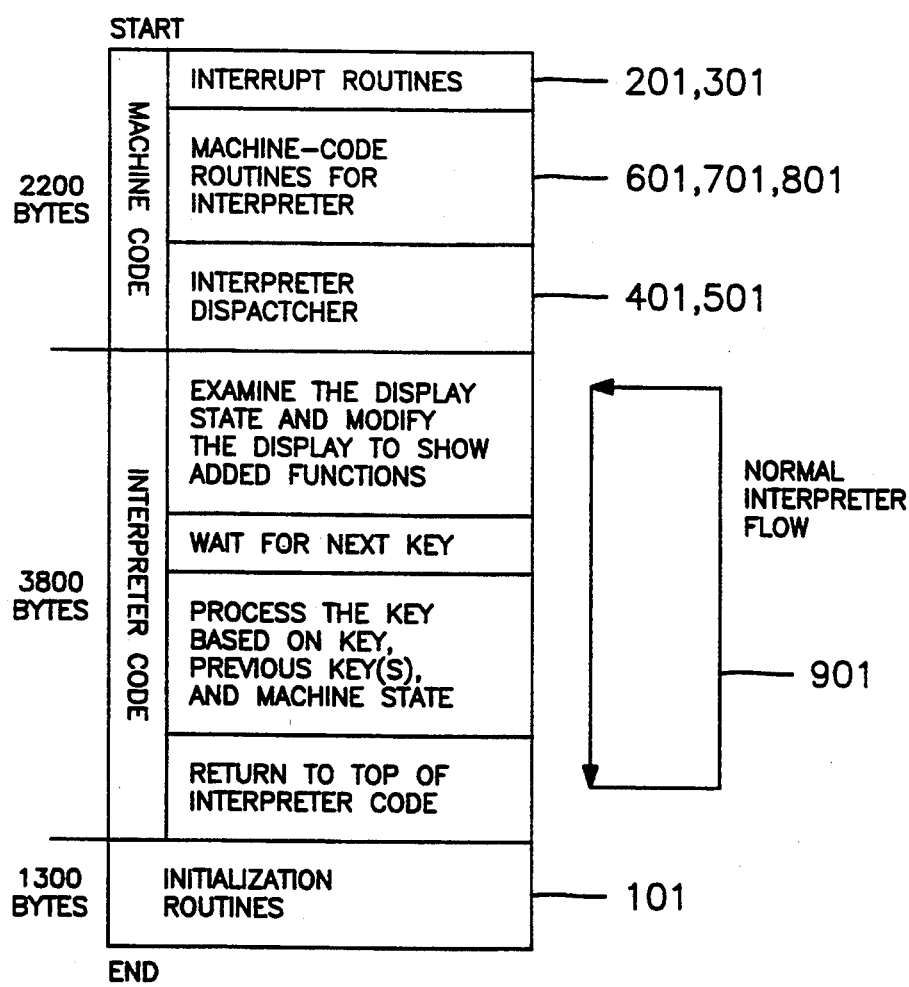
FIG. 2 is a chart illustrating the layout of the computer program portion of the present invention.

FIG. 1 illustrates how the Companion interacts with the internal components, hardware and software, of the computer. While the Figure purports to show the Companion to occupy several "locations" in the computer, it is noted that the diagram shown in FIG. 2 is meant to functionally illustrate how the Companion exchanges data with the internal components and systems in the computer.

The Companion is schematically shown at blocks 3, 5, 8, 12 and 15, and if the computer program of the Companion is not installed and loaded into the computer, the shaded blocks 3, 5, 8, 12 and 15 would not exist. In that case, there would be direct logical connections between blocks 2 and 6, 4 and 6, 7 and 9, 11 and 13, and 14 and 16. The program may be installed into the computer by several means, including diskette, downloading from a computer bulletin such as CompuServe, or PCMCIA (Personal Computer Memory Card International Association), or downloading via a serial port from a host computer. However, once the program is loaded, the Companion is connected (via step 109 of FIG. 4) to receive certain interrupts, and thereby obtain control when certain events occur.

In block 3, the Companion intercepts interrupts generated by key presses and key releases in order to detect when certain keys on the keyboard are pressed and/or released. These events originate in block 2. When these events (keystrokes) occur, the Companion usually passes them on to the BIOS, DOS and system manager in block 6. However, if the event is of particular interest to the Companion, it might take some action such as setting a flag in memory. It is also possible for the Companion to return control to block 2 without passing the event onward.

In block 5, the Companion intercepts all requests for keystrokes made by the active built-in application program shown in block 4. Usually the Companion simply passes the request to the BIOS in block 6 which will return to block 5 with a keyboard code when the next key is pressed. In some cases, a simulated keystroke might be immediately returned to the application program in block 4 from block 5 without going to the BIOS. That would occur when the Companion is performing a task that requires one or more simulated keystrokes. Alternately, the logic in block 5 can cause a keystroke returned from the BIOS in block 6 to be ignored, by immediately making another keystroke request to the BIOS in block 6 without passing a character back to the application program in block 4.

In block 8, the Companion can access any memory variable from memory shown in block 7, and test the characters that are displayed on the screen by examining the display RAM shown in block 9, associated with the display shown in block 10. This allows the Companion to take different actions depending on the particular state of the memory and the display.

Block 12 shows that the Companion may gain control of computer functions with each clock interrupt. This permits the Companion to perform certain timing functions, such as recording the amount of time the computer has been operating on battery power or determining the amount of time between keystrokes. In addition, the clock interrupt logic of the Companion allows certain automatic functions to be triggered based on the time of day, instead of only when specific keystrokes are made. All clock interrupts are passed to the BIOS shown in block 13 to allow the normal BIOS timer and DOS clock functions to occur.

Block 15 shows that the Companion can include logic to prevent the user from hearing certain error signals by temporarily disabling the beep logic of the BIOS. The Companion may intentionally issue a keystroke that causes a beep in order to determine additional information about the machine state as an aide in navigating through the mainline logic. For example, if the 95LX "beeps" when the ESCAPE character is sent when trying to close an application, the Companion aborts the Mass Exit loop. The Companion will also abort any major loop, including the Mass Exit loop, if the loop appears to be executing too many times. This prevents the machine from locking up if it gets hopelessly confused.

Between certain of the blocks in FIG. 1 are references to certain steps of the flowcharts shown in FIGS. 4–8. For example, the logic in block 5 initiated by requests made from block 4 starts in step 201 of the flowchart shown in FIG. 5. These flowcharts will be described hereinafter.

FIG. 2 illustrates the overall layout of the computer program of the Companion, with reference numerals corresponding to the flowcharts in FIGS. 4–11. The program can be seen as having three processing sections.

The first section contains the machine-code routines and data that are used by the processor of the palmtop computer to implement all Companion functions. This includes the interrupt routines, which will be described hereinafter, the machine-code routines that are called by the interpreter to perform special Companion functions, and the interpreter dispatcher which calls the machine-code routines according to a data set of interpreter commands. All of these items are described in more detail hereinafter.

The second section is the interpreter code which consists of many sequences of commands and arguments that define the features of the Companion and which give the Companion its unique characteristics. These codes consist of:

(a) a list of pointers to various machine-code routines that must be called in order to implement the functions;

(b) optional arguments used by those machine-code routines;

(c) actual characters or keystrokes that should be output to the application program; and (d) addresses within the interpreter code of alternate code sequences to which control should be transferred (called "branch addresses").

The third section contains the system initialization routines that are used just once and are run immediately after the program is loaded by DOS. These routines are placed at the end of the program so that they can be deleted after they have been used, thus reclaiming scarce memory space for use by DOS and the application programs.

As shown in FIG. 2, the program uses a command interpreter to control most of its special functions. An "interpreter" is a well known computer programming concept that simplifies program writing. This programming method substantially reduces the size of the program, although at the expense of slower speed. In a palmtop computer, memory space is very limited, and a slight speed reduction is not noticed at all by the user because the program still runs fast enough to keep up with the maximum rate of human typing.

The meaning and function of the interpreter commands are chosen based on the unique needs of the Companion. For example, one command ("TESTKEY") tests the current keystroke to see if it matches a specified character (detailed in the flowchart starting with step 601 in FIG. 9B). Another command ("TESTDSPL") tests the display to see if a specified character string appears at a specified location (detailed in the flowcharts starting with step 801 in FIG. 11B). A third command ("DISPLAY") writes a specified character string to the display RAM of the display at a specified location, and operates similar to the test commands. In effect, the interpreter is a virtual processor that executes commands which are particularly appropriate for implementing the special functions of the Companion.

The central processing chip of the computer contains a "program counter" that keeps track of which machine instruction is being executed. Normally, the program counter increments by one so that machine instructions are executed in sequence. By contrast, the interpreter has a "location pointer" that is stored in memory which represents the address of the interpreter code instruction being executed. Each loop through the interpreter dispatcher, which itself is a machine-language routine consisting of several machine instructions, processes one interpreter command code.

Figure 3A:
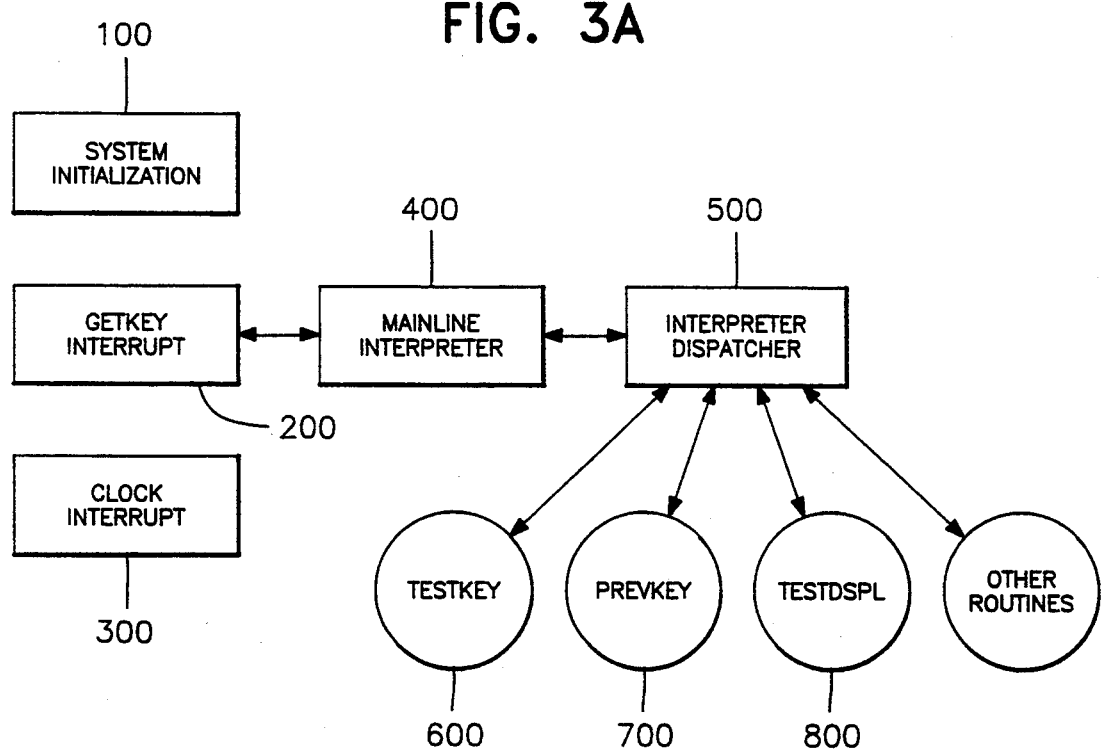
FIGS. 3A and 3B are general flow diagrams illustrating the organization of the computer program portion of the present invention.
Figure 3B:
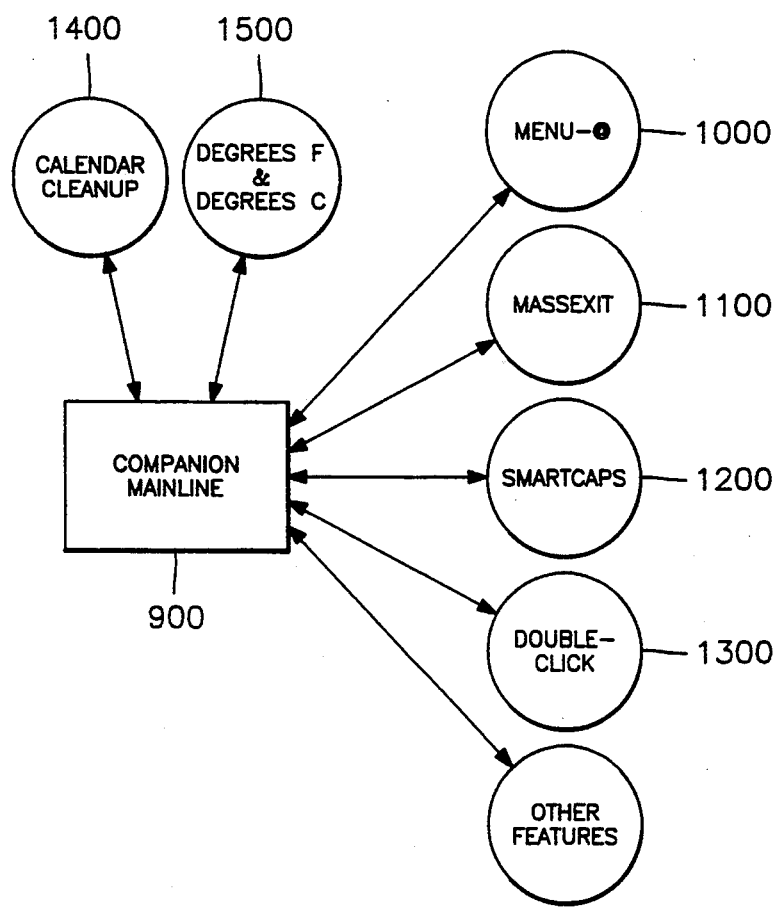

FIGS. 3A and 3B show the organization of the various routines of the Companion, with reference numerals representing the flowcharts shown in FIGS. 4–16. As shown in FIG. 3A, the system initialization routine 100 is run when the program is loaded, and then it is not executed again. The GETKEY interrupt routine 200 interacts with a mainline interpreter routine and an interpreter dispatcher routine 500. The interpreter dispatcher is a sort of "hub" which selects for execution among several machine-code routines, including the TESTKEY routine 600 (FIG. 9B), PREVKEY routine 700 (FIG. 10B), TESTDSPL routine 800 (FIG. 11B), and other routines. Similarly, as shown in FIG. 3B, the mainline routine 900 is a "hub" for several specialized routines including FAST SAVE AND EXIT (MENU-@) 1000, MASS EXIT 1100, SMART CAPS 1200, and DOUBLE-CLICK 1300, CALENDAR CLEANUP 1400, AND FAHRENHEIT-CELSIUS CONVERSION DISPLAY 1500.

In all of the flowcharts illustrated in the drawings, certain blocks are outlined bolder than other blocks. The bold boxes are those steps which are almost always executed, whereas the boxes not in bold are steps which are executed only if certain condition or conditions exist. Such conditions could be the result of particular machine modes that might have changed by the time the computer or interpreter executes the next pass through the routine. The bold lines are shown to help the reader ascertain the most common steps that occur in the routines.

Figure 4:
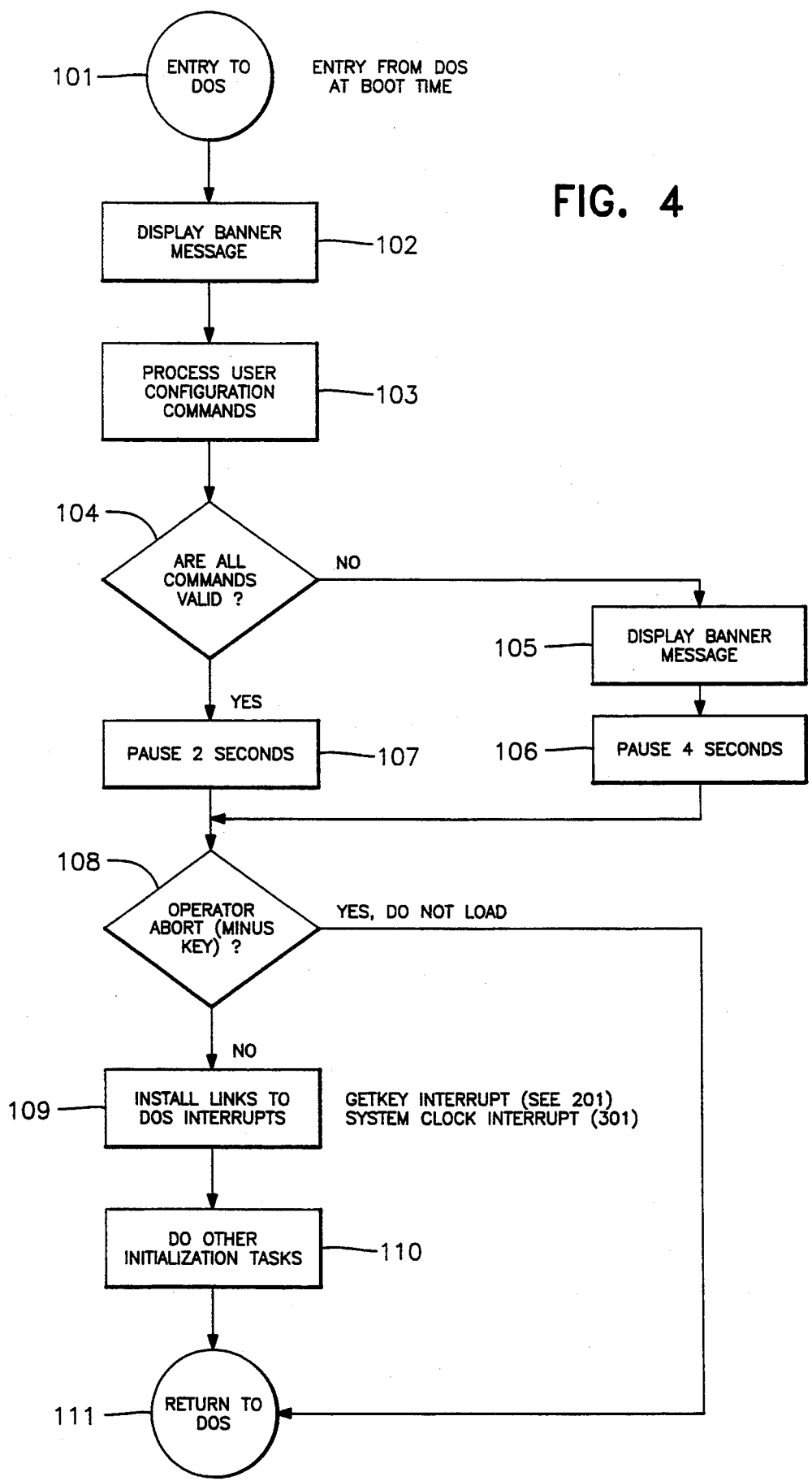
FIG. 4 is a flowchart diagram illustrating the system initialization routine of the computer program.

Turning now to FIG. 4, the system initialization routine will be described. Step 101 is the entry point that is called by DOS when the program is loaded at boot-time. The DOS loads the computer program as a device driver based on a "DEVICE" command in the user's configuration file ("CONFIG.SYS"). The DEVICE line for the program may also include special Companion configuration commands. The program checks the configuration commands for syntax errors and sets various internal variables in the program according to the commands in step 103. The user is then given an opportunity to abort the load process in step 108. If the user does not abort the load process, then the program attaches itself to intercept certain BIOS and DOS interrupts by calling the appropriate BIOS interrupt-chaining functions in step 109. This links the program into the interrupt routines that control the keyboard, system clock, and other important BIOS and DOS functions. When the initialization is complete, a return is made to DOS at step 111.

The user configuration file may be set up by a user to control the Companion. Specifically, the configuration file may deactivate certain Companion functions and alter parameters in other Companion functions. In addition, a user may create his/her own specialized Companion functions which may be loaded into the program through the configuration file.

Furthermore, the Companion may be deactivated and activated by typing a certain keystroke sequence. For example, "CTRL-MINUS" twice will turn the Companion off and "CTRL-PLUS" once will activate the Companion. This permits the Companion to be disabled if the user wishes to temporarily avoid the automatic activation of its features.

Figure 5:
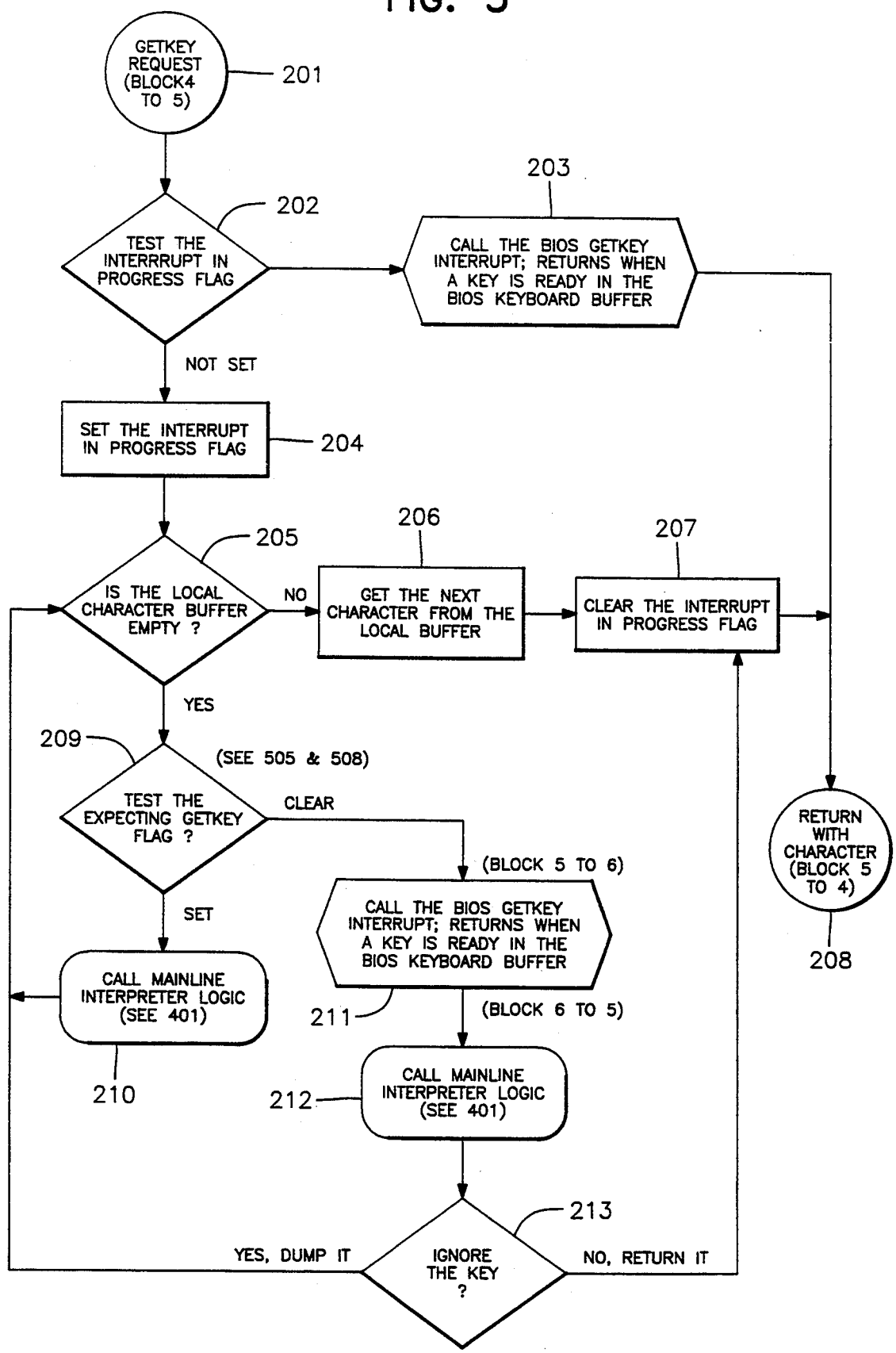
FIG. 5 is a flowchart diagram illustrating the GET-KEY request routine.

FIG. 5 illustrates the GETKEY request routine. Whenever the active application program is ready for the next keystroke, it makes a "GETKEY" request to the BIOS. The Companion intercepts the request (as described in the discussion regarding FIG. 1) and the logic starting at step 201 is begun. Steps 202, 203, 204, and 207 prevent the rest of the logic from being re-entered if another request for a key is made while the current request is being processed. (This could occur, for example, if the current request causes the Companion to make a DOS function call to obtain the size of the plug-in RAM card.)

Step 205 is the beginning of the main logic loop. A test is made in step 205 to determine if there are simulated keystrokes still waiting to be returned to the application program. If there are, then the next such keystroke is fetched from a buffer in step 206 and returned to the application in step 208. If the buffer is empty (the normal state), a test is made in step 209 to determine whether the GETKEY request is expected by the Companion. The request would be expected if the Companion had just returned a keystroke to the application program and needed to wait for the application program to process the keystroke before continuing. The resulting machine state (also called program mode) would then be used in step 210 to determine the next action (if any) or modify the display (if necessary). If the request is not expected, step 211 is reached. This causes the GETKEY request to be passed on to the BIOS. The BIOS returns when the next keystroke is received from the keyboard. (In actuality, the HP 95LX BIOS returns every 500 milliseconds, even if there has been no keystroke. For simplicity, the Companion logic that ignores such returns has been omitted from the flowcharts.)

When the next keystroke has been received, the Companion logic in step 212 will determine the action to be taken. Depending on the keystroke and the machine state, the action will be to return the keystroke (via steps 207 and 208) or to ignore it (by going back to step 205). If the keystroke is ignored, either an alternate keystroke or set of keystrokes will be returned (by virtue of the buffer tested in step 205 having been set up in step 212) or the Companion will wait for the next keystroke by going on to step 211.

Steps 210 and 212 are both calls to the mainline interpreter which starts at step 401. The interpreter is described below.

Figure 6:
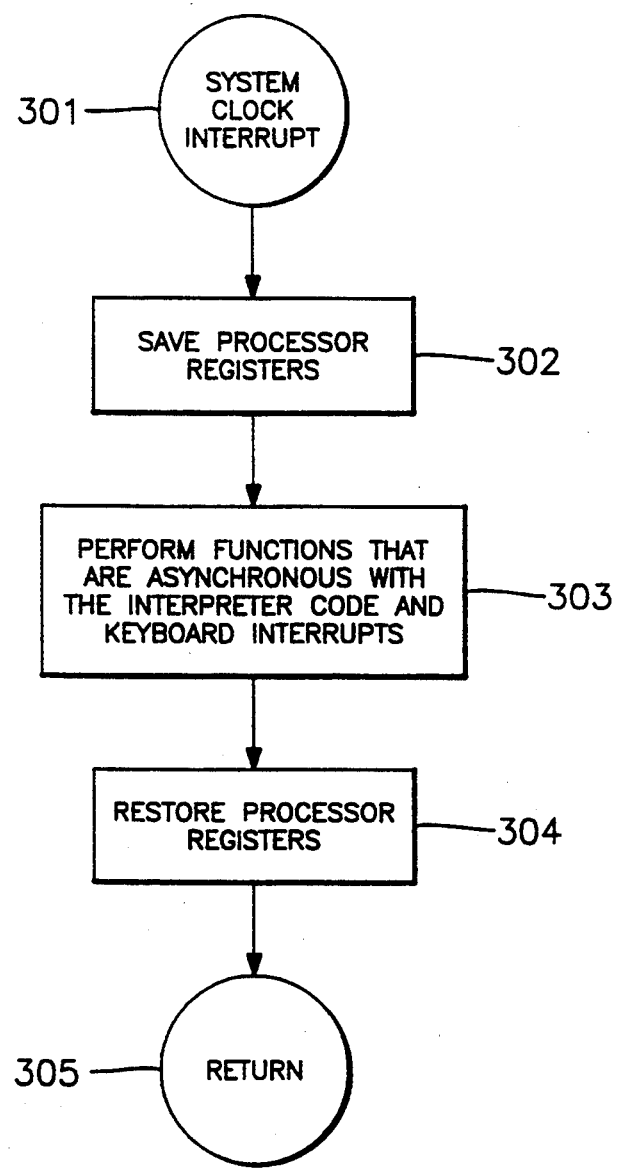
FIG. 6 is a flowchart diagram illustrating the clock interrupt routine.

FIG. 6 illustrates the system clock interrupt routine 300, which is responsive to a DOS interrupt. The system clock interrupt is generated by a hardware timer. In the HP 95LX, clock interrupts occur every 55 milliseconds. The interrupt is used by the BIOS and DOS to maintain the time-of-day and trigger other time-based events. The Companion intercepts the clock interrupt at step 301 and performs functions in step 303 that are not directly related to keystrokes. For example, the Companion adjusts the time-of-day clock every 90 seconds to make it keep more accurate time (this repairs a defect in the HP 95LX clock logic).

Steps 302 and 304 save and restore the processor registers so that the logic in step 303 will not alter any critical values that were contained in the registers when the clock interrupt occurred. Step 305 passes control on to the normal BIOS and DOS clock interrupt logic.

Figure 7:
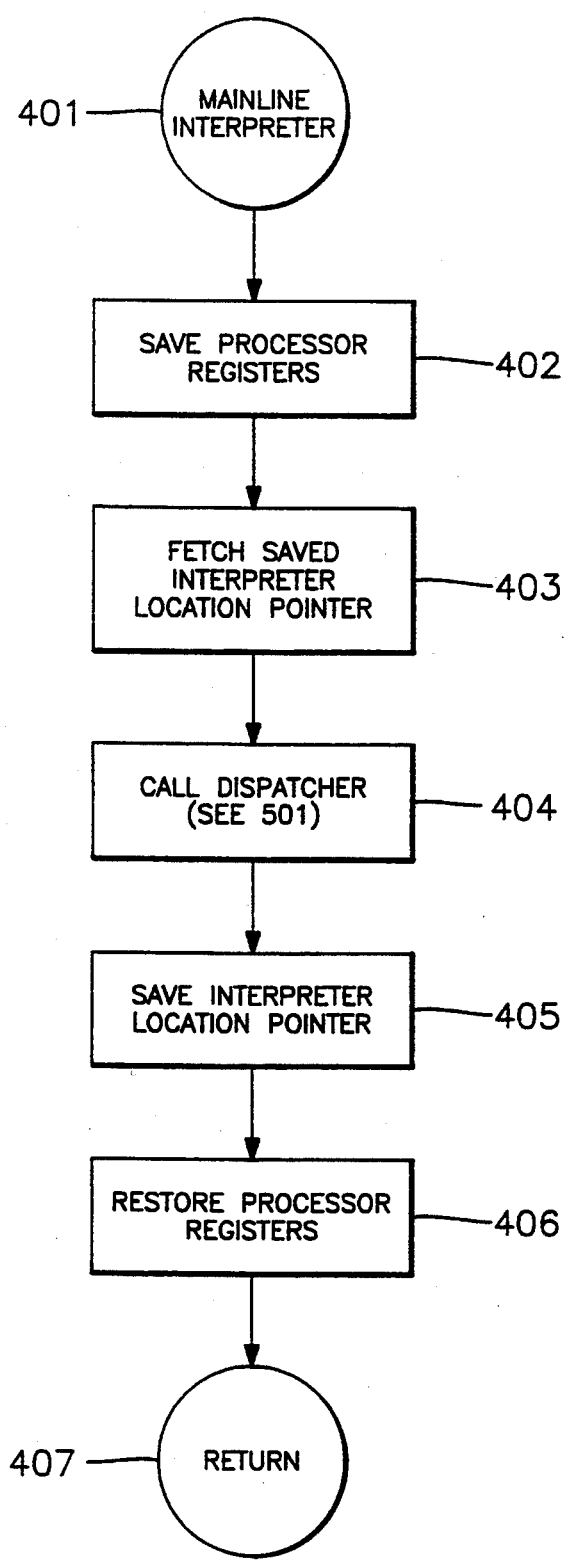
FIG. 7 is a flowchart diagram illustrating the mainline interpreter routine.

FIG. 7 illustrates the mainline interpreter routine. Step 401 is the mainline interpreter entry point, called by steps 210 and 212. Prior to starting the interpreter logic, the processor registers are saved (step 402) and the value of the location pointer is recalled from memory (step 403). The location pointer always marks the current position in the interpreter code that is being executed. Step 403 simply restores the location pointer to its prior value so that the interpreter logic continues on from the point at which it left off on the previous exit from the dispatcher.

Steps 405 and 406 save the location pointer and restore the processor registers when the dispatcher returns. Step 407 returns to the calling step (210 or 212).

Figure 8:
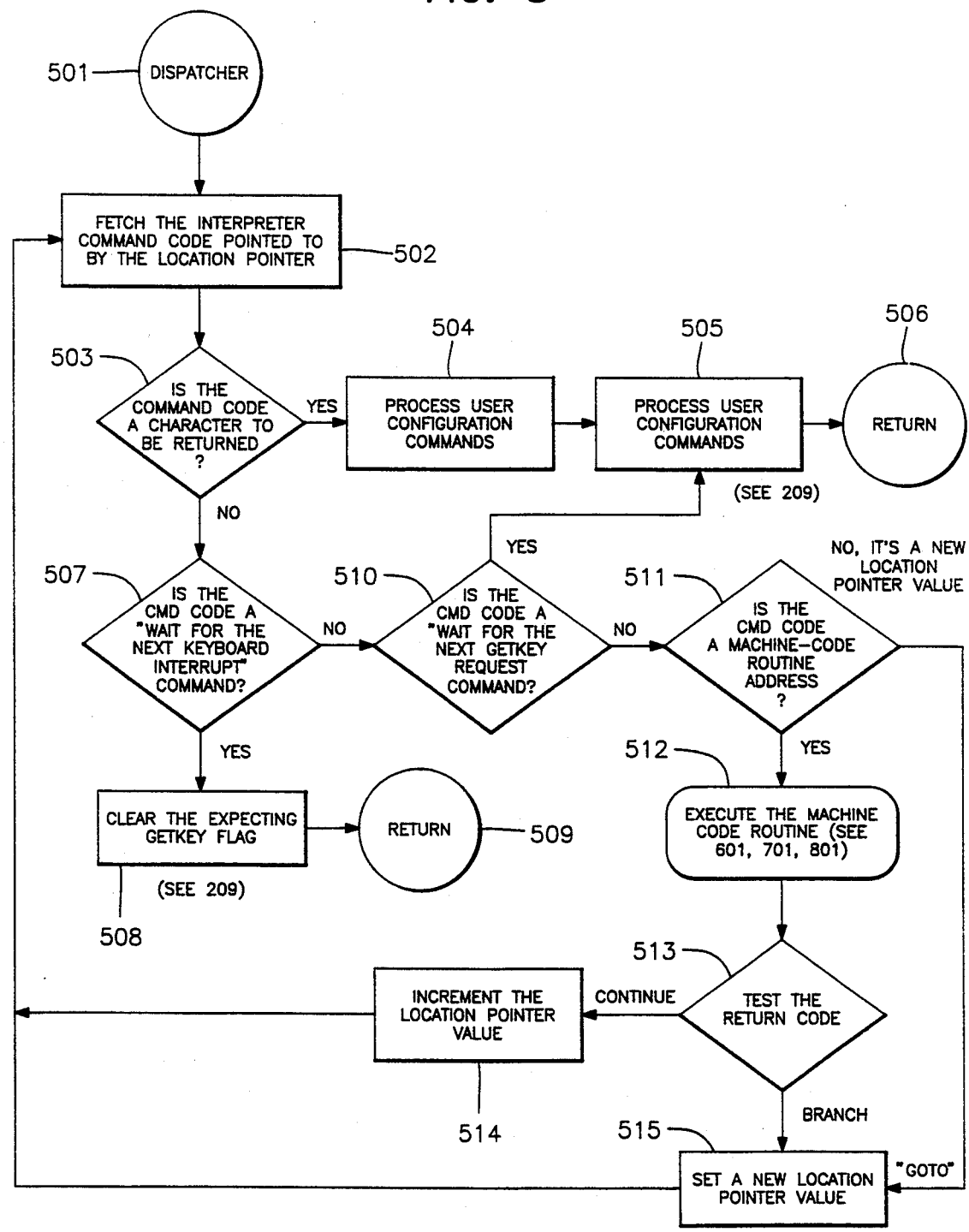
FIG. 8 is a flowchart diagram illustrating the interpreter dispatcher routine.

FIG. 8 illustrates the interpreter dispatch routine. This is the workhorse of the interpreter logic. Each time the dispatcher loops through step 502, another interpreter command code is fetched and processed. Normally, the command codes are fetched and processed in the sequence in which they occur in memory.

In order to save space, certain command codes are special. In the program, if the address of the command code is less than 256 or greater than 12288, the code is taken to be a simulated keystroke that must be returned to the application program. This condition is tested in step 503. If the test passes, then the code is placed in a buffer (step 504) and the dispatcher returns (step 506). Setting of the "expecting flag" (in step 505) causes the interpreter to be restarted (via steps 209 and 210) when the buffer is later emptied.

If the interpreter command code is not a keystroke, it is taken as to be either the address of a machine-code routine that should be called to process the interpreter command or a new location pointer value. Two machine-code routines are special because they will cause the interpreter to exit. The logic of the special routines are shown by steps 507 and 510. If the command code matches the test in step 507, the interpreter will clear the expecting flag (step 508) and return. This will cause the BIOS GETKEY routine to be called before the interpreter is restarted (step 211). On the other hand, if the command code matches the test in step 510, the interpreter will set the expecting flag (step 505) and return. This will cause the interpreter to be restarted via step 210 without first calling the BIOS GETKEY routine.

Whether or not the interpreter exits via step 505 or 508 is determined by the logic of the interpreter mainline code. That is, a return occurs based on the functionality of the Companion. The interpreter dispatcher is merely implementing the commands as they are encountered in the interpreter mainline code.

If the code is not a keystroke or a pointer to one of the special exit routines described above, it is tested in step 511 to determine if it matches the address of a machine-code routine. If it does, the particular machine-code routine is called (step 512) and that routine processes the command. Depending on the outcome of tests in the machine-code routine, the interpreter dispatcher will either increment the location pointer in step 514 to point to the next command code in the sequence or set a new value in step 515. The new value, if any, is contained in the interpreter code, and usually follows the command code. The machine-code routine is responsible for determining what the new location pointer should be.

At step 511, if the command code is not a machine code-routine address, the code is taken to be a new location pointer value, which is simply set in step 515. This causes the next command code (fetched in step 502) to be taken from a location that is not necessarily the next interpreter command in the memory sequence. This is analogous to a computer branch or jump instruction.

FIGS. 9-11 illustrate the specialized machine-code routines. These routines are representative of many other specialized machine-code routines.

FIGS. 9A and 9B depict the operation of the TESTKEY routine. There are many TESTKEY commands used by the Companion. The structure of the interpreter command code for a TESTKEY command is shown in FIG. 9A. The interpreter command for a TESTKEY command comprises three 16-bit data values, which includes a TESTKEY command portion, a branch address if no match is made, and a key comparison value. The TESTKEY command is designed to compare a particular keystroke input of the keyboard with a particular key comparison value.

The logic flow for executing a TESTKEY command is shown in FIG. 9B. Once the command is seen in the current interpreter command code instruction being executed, the key comparison value noted in the interpreter command code is fetched in step 602. This value is then compared with the current key in step 603. If there is a match, the routine returns with a "continue" return code in step 604. If there is no match, the routine returns with a "branch" return code in step 605.

Figure 10A:
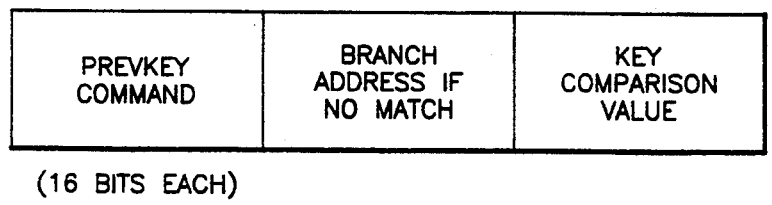
Figure 10B:
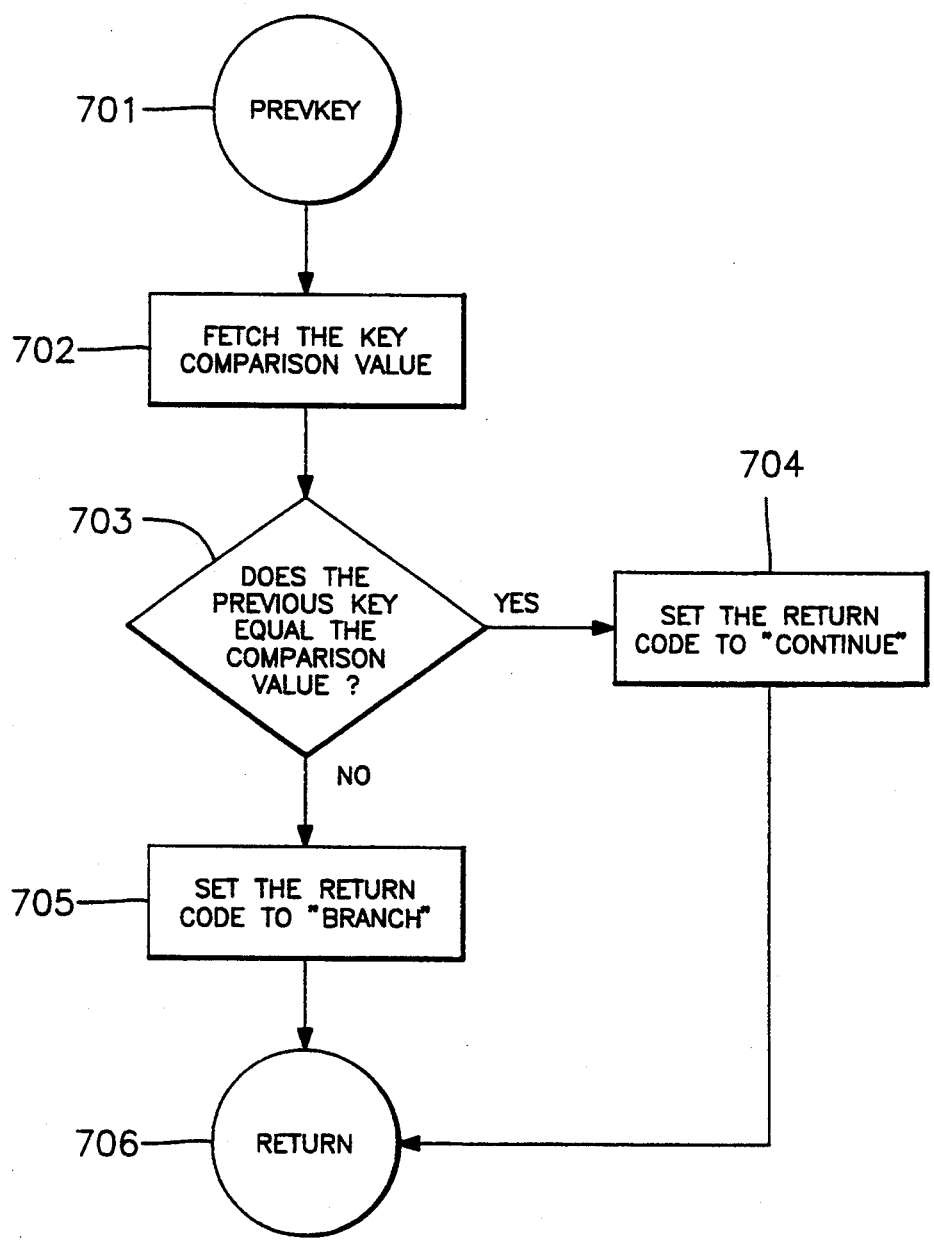

FIGS. 10A and 10B depict the operation of the PREVKEY command. The interpreter command code has the same type of organization as the TESTKEY command code organization, and the logic flow in the execution of the command is very similar. The TESTKEY command examines the current keystroke, while the PREVKEY command examines the previous keystroke.

Figures 11A, 11B:
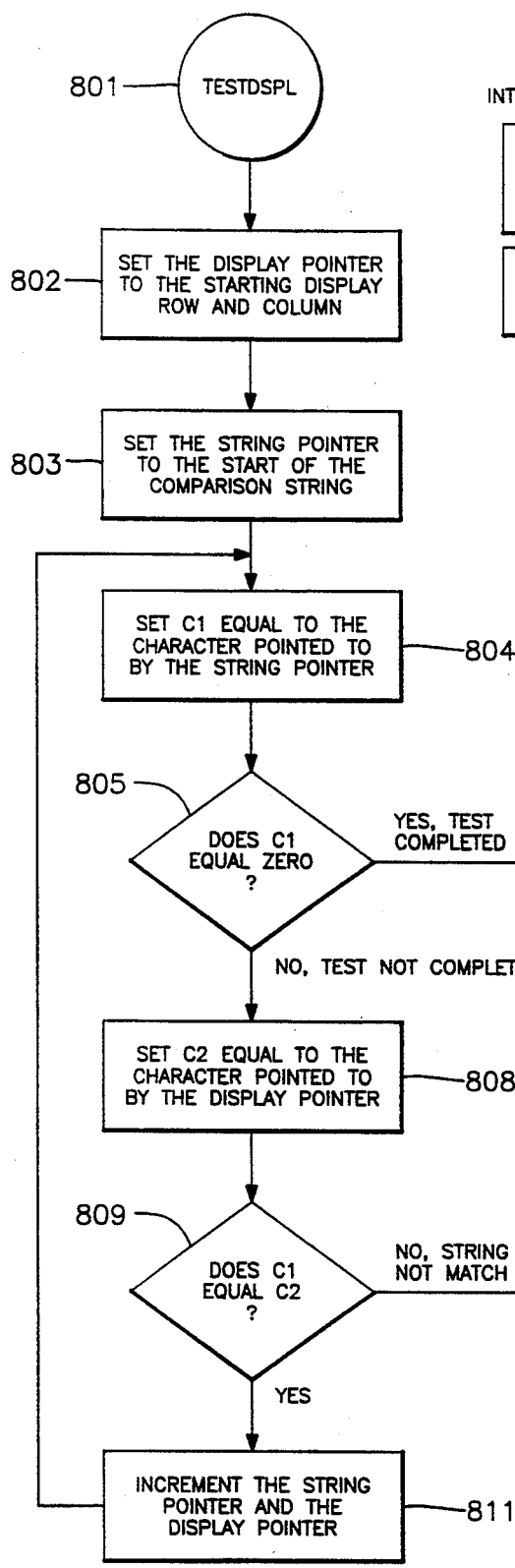

FIGS. 11A and 11B depict the operation of the TESTDSPL command. The interpreter code for the TESTDSPL command is similar to the TESTKEY command, but further includes a starting display row and column designation and a comparison text string designation. The comparison string is one or more non-zero 8-bit values. The last value of the comparison string is zero and acts as an end-of-string marker.

In operation, the execution of a TESTDSPL command begins with setting the display pointer to the starting display row and column specified in the interpreter code instruction, in step 802. This finds the particular area of the display screen to be tested for certain displayed characters. In actuality, this corresponds to a particular address in the display Ram which drives the display screen. Next, in step 803 the string pointer is set to the start of the comparison string. The "string pointer" and "display pointer" are local variables created and used to examine a text string. Then, in step 804, a local variable C1 is set equal to the character pointed to by the string pointer.

In step 805, a comparison is made to determine if C1 equals zero, and if so, then the text of the comparison string is complete (thus the two strings are identical) then the routine returns with a "continue" return code. If C1 does not equal zero, then the test of the character string is determined not to be complete, and in step 808 a local variable C2 is set equal to the character pointed to by the display pointer. Finally, in step 809, C1 and C2 are compared to determine if the string is a match. If a match is found, then in step 811 the string pointer and display pointer are incremented. If no match is found (thus the two strings are not identical), then in step 810 the routine returns with a "branch" code.

The specialized machine-code routines shown in FIGS. 9-11, and others that are not shown, are called by Companion function routines, some perhaps several times, as will be understood by the description of FIGS. 13-18.

Figure 12:
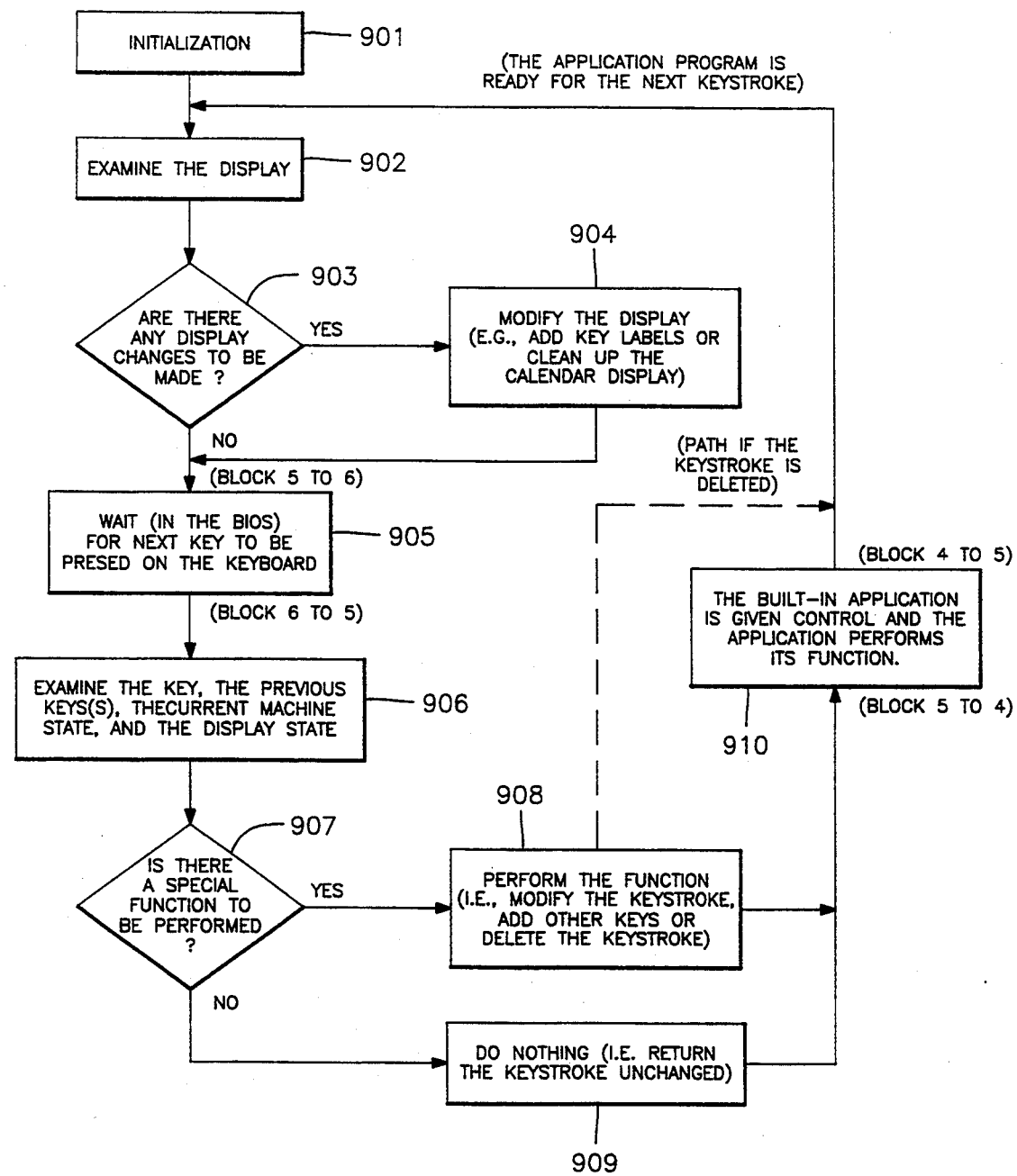
FIG. 12 is a flowchart diagram illustrating the mainline logic of the method according to the present invention.

FIG. 12 illustrates the logic flow of the Companion mainline routine. The mainline routine is a "hub" for the specialized Companion function routines which are used to alter the "look-and-feel" of the computer. The mainline routine monitors the mode in which the computer is in by examining the display. Depending on the mode of the computer, the mainline routine will execute one or more specialized Companion function routines to alter the display output of and/or keyboard input to the computer.

The mainline portion of the interpreter code implements the functions of the Companion. This code consists of a number of command sequences, some combination of which is executed for each keystroke. If the keystroke is of particular interest and if the machine mode is appropriate, certain sequences of these commands will be executed, thus implementing some particular feature of the Companion.

The initialization step 901 contains commands that are executed only once. These commands set certain variables prior to starting the main loop, such as reading the saved battery timer value and special user configuration commands from disk files.

The main loop starts at step 902. There are a number of tests made to determine which application program is active. Depending on the outcome of these tests, certain changes may be made to the display. For example, if the HP 95LX calculator program is active, and in a certain math mode, the Companion will change the display to show the °F. and °C. conversion symbols above function key F9, thus making the user aware of the new functional assignments of that key. In the case of the appointment book application, if the monthly calendar is active, the underlines under the dates will be removed to make the display more readable. For simplicity, the flowchart shows only one test step 903, although there are, in fact many tests and numerous display changes in step 904 that could be made. The flowcharts beginning with command-code steps 1401 and 1502 (FIGS. 17 and 18), are examples of two such state tests and display changes.

After the display is tested and possibly display changes are made in steps 903 and 904, the Companion waits for the next keystroke in step 905. This step is actually implemented by a call to the BIOS GETKEY routine (via machine-code steps 507, 508, 209 and 211, plus the intervening steps shown in the corresponding flowcharts). This is also shown in the interconnection diagram by the connection between block 5 and block 6 in FIG. 1. When the next key is pressed, the Companion resumes control at step 906 and proceeds to analyze the particular key to determine if a special function has been triggered. This is depicted in steps 906 and 907, although there are, in fact, many tests performed. Most of the tests will result in no action to be taken. However, some may trigger a command sequence and perform a special function in step 908. The flowcharts starting with command-code steps 1001, 1101, 1201 and 1301 (FIGS. 13-16), are examples of four test and function performers.

There are three fundamental actions that could occur when a Companion function is performed. The keystroke could be:

(a) changed to some other keystroke character;
(b) changed to a series of keystroke characters; or
(c) deleted and not sent to the application program.

These possible actions are shown by steps 908, 909 and 910.

A single (changed) keystroke is returned to the application program by the execution of machine-code steps 503, 504, 505, 213 and 207, including the intervening steps shown in FIGS. 5, 7 and 8. A series of keystrokes is returned to the application program by the execution of machine-code steps 503, 504, 505, 213, 205, 206 and 207, followed by repetitive execution of steps 205 and 206, until the keystroke buffer is emptied. A keystroke is deleted by the execution of steps 510, 505, 213, 305, 209 and 210.

If all tests depicted by step 907 fail, the keystroke is of no special interest, and the keystroke is therefore returned to the application program without change in steps 909 and 910. This is achieved by machine-code steps 510, 505, 213 and 207.

All keystrokes are returned to the application program via the connection between block 5 and block 4 shown in FIG. 1.

If the application program is sent one or more keystrokes, the Companion waits for the keystrokes to be processed by the application program in step 910. This will likely cause a change in data processed by the application program and data supplied to the display. After the application program has processed the keystroke(s), the mainline loop of the Companion is restarted at step 902, thus repeating the above-described logic. Step 902 is initiated by machine-code steps 201, 209 and 210.

FIGS. 13-18 illustrate the logic for several Companion functions. These are only representative of many special functions which may be provided by the Companion. Step 902 represents for some Companion functions, the first step in the Companion function logic, while for others, step 907 represents the first step. Accordingly the mainline Companion logic shown in FIG. 12 tests all the possible Companion functions for their pertinency to the active built-in application program, and the program mode of the application program.

Figure 13:
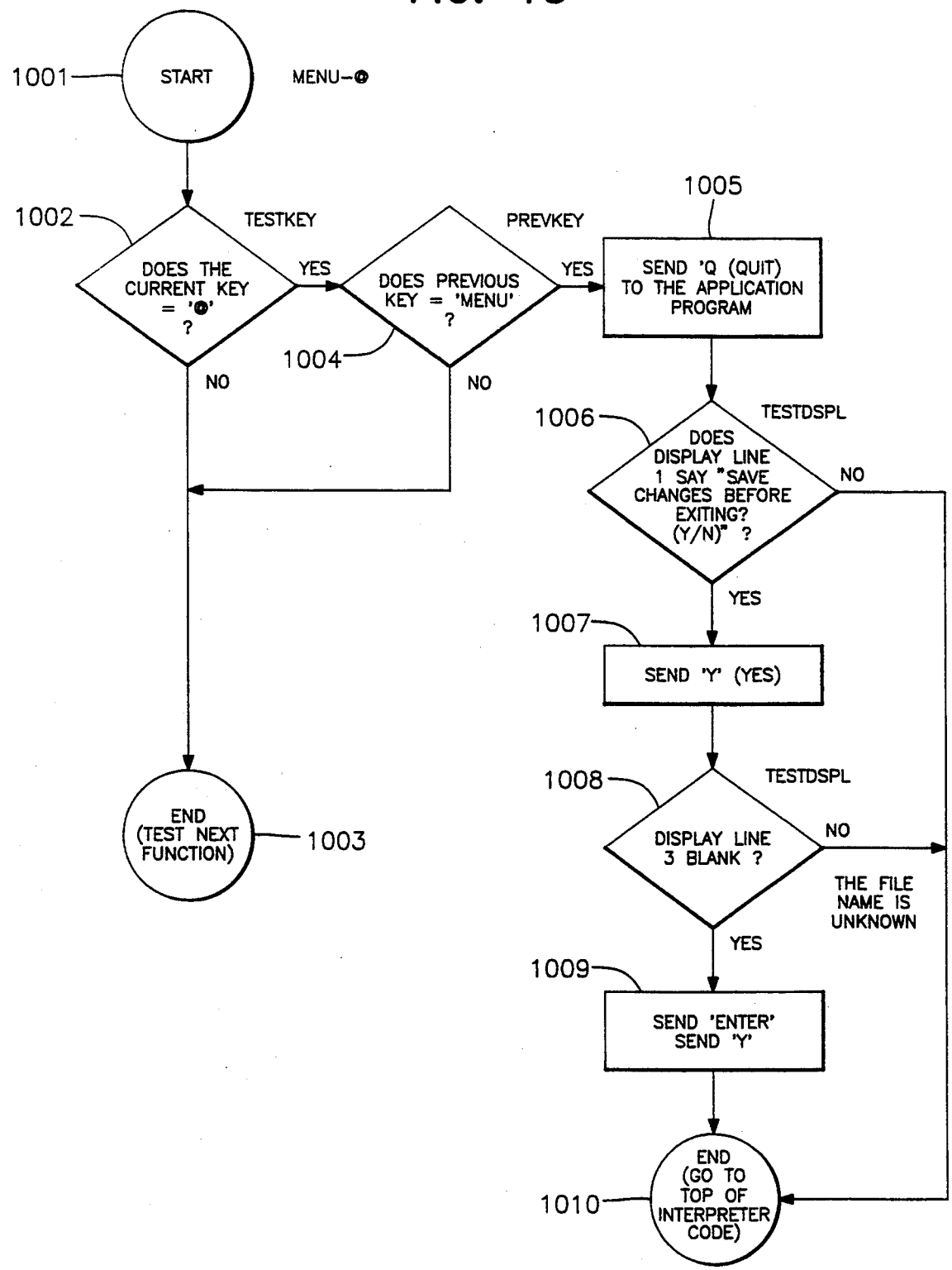
FIG. 13 is a flowchart diagram of a "FAST SAVE AND EXIT" Companion function routine.

FIG. 13 illustrates the logic flow for a FAST SAVE AND EXIT function, also called MENU-@ for its particular application to certain commands to exit an application program in the 95LX and save the file. Similar functions may be provided on different palmtop computers which may have different command keystrokes. The fast save feature is designed to save work in progress and then quit an application. If the currently open file is "dirty" (i.e., if it has been modified and not yet saved), then the fast save feature first saves the file and then quits the application. If the currently open file is not dirty, then the application is simply quit.

In step 1002, the TESTKEY routine is executed to determine if the current keystroke is the "@" character. Then, if the test result is positive, the PREVKEY routine is executed in step 1004 to determine if the previous keystroke is the "MENU" key. If the answer is yes to step 1004, then in step 1005, the Companion generates and sends to the application program the character "q" ( for "quit"), which is the HP 95LX command to quit the active application program. Next, in step 1006, the TESTDSPL routine is executed to determine if on line 1 of the display the built-in application program has generated and sent for display the character string "Save changes before exiting (Y/N)". This is an HP 95LX prompt. If this string of characters is found on the display, then the character "y" is sent to the application program, to terminate the application program in step 1007. Next, in step 1008, the TESTDSPL routine is executed to determine if line 3 of the display is blank. This test is to determine if the modified file is to be saved to a file whose name has been previously specified. In the HP 95LX, line 3 will be blank if the file name is known to the application, otherwise line 3 will show the first of several possible file names from which the user is expected to choose. If the file name is not known, the Companion aborts the FAST SAVE AND EXIT process to allow the user to intervene. The user may select a file from the list or manually enter a new name. If the answer to the test in step 1008 is yes, then in step 1009, the character key for "ENTER" is sent followed by "y", to the application program.

As an example of the interpreter code syntax, the following is a listing of the commands to implement the MENU-@ routine:

| | | |
|---|---|---|
| START: | TESTKEY,NOTKEY, '@' | 1002 |
| | PREVKEY,NOTKEY, 'MENU' | 1004 |
| | WRCHAR, 'q' | 1005 |
| | TESTDSPL,MAINLOOP,DLINE1, "Save",0 | 1006 |
| | WRCHAR, 'y' | 1007 |
| | TESTDSPL,MAINLOOP,DLINE3, ' ',0 | 1008 |
| | WRCHAR, 'ENTER' | 1009 |
| | WRCHAR, 'y' | 1009 |
| | GOTO,MAINLOOP | 1010 |
| NOTKEY: | | |

If in step 1002, the current key is not "@" then the routine is immediately exited, and another function is tested for its relevance to the active application program.

Figure 14:
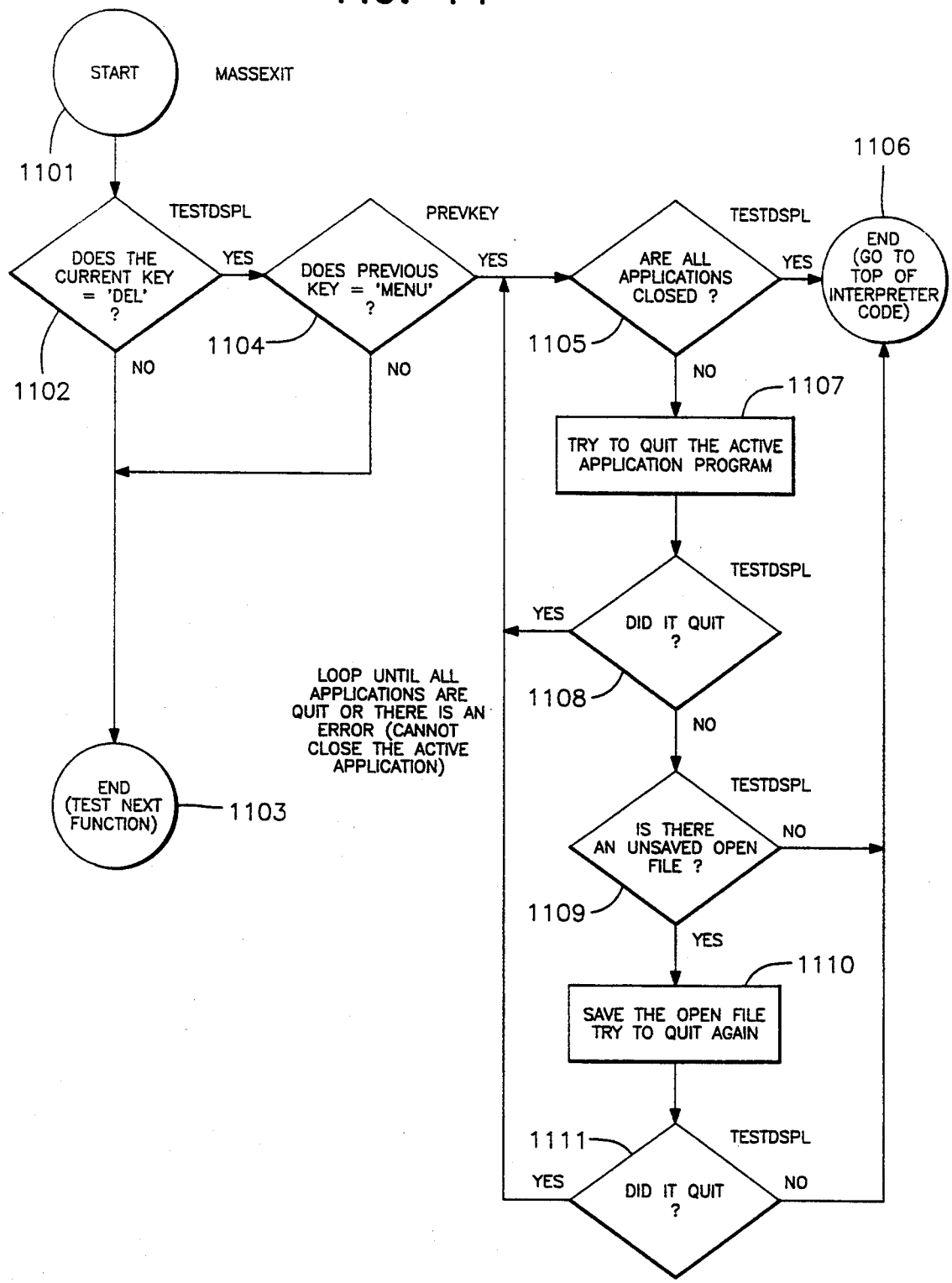
FIG. 14 is a flowchart diagram of a "MASS EXIT" Companion function routine.

FIG. 14 illustrates a MASS EXIT routine for exiting all active application programs on the computer opened by a user at one session. In step 1102, the TESTDSPL routine is executed to determine if the current key is "DEL". If not, then this function routine is immediately terminated and the next Companion function routine is tested for its relevance to the active application program.

Otherwise, if the current key is "DEL" then in step 1104, the PREVKEY routine is executed to determine if the previous key is "MENU". If the test result to step 1104 is positive, then in step 1105, the TESTDSPL routine is executed to determine if all applications are closed.

There are two display modes in the 95LX: ASCII and graphic. Most displays are ASCII. An ASCII display consists of any of 256, preset 5-by-7 "characters" that are either alphabetic, numeric, or symbolic. Symbols are the usual typewriter set, plus some specials, such as lines, corners, and other characters that can be used to create limited graphic-looking displays. In graphic display mode, the application program can manipulate each pixel of the display. Most pictures or charts must be displayed in graphic mode.

The 95LX, when all applications are closed, the screen goes into graphic mode and displays what is called a "topcard." This either shows the user's name and company affiliation, a $1000 bill, or some other picture file loaded by the user. Graphics are harder for Companion to "examine" because there are so many pixels that would have to be tested. The Companion does not test the content of graphic displays. If the display goes into graphic mode during the Mass Exit logic loop (the Companion tests for that happening), the Companion will send an ESCAPE character to the active application, just in case the graphic is not the topcard. If the graphic is not the topcard, the ESCAPE character will usually cause the active application to remove the graphic, thus revealing another display mode that might, on the next loop through the Mass Exit logic, be recognized. If the graphic is the topcard, then the 95LX will "beep" when the ESCAPE is issued. If the 95LX "beeps," then the Companion aborts the loop because either the topcard has been reached (the desired objective) or there is an unknown display shown (in which the Companion just gives up). The Companion actually monitors for an audible alert signal request and, if necessary, intercepts and dumps the attempt that the application program makes to issue the beep. Thus, the Companion does not allow the user to hear the beep, but the Companion "hears" it. This is accomplished by another interrupt chain (shown by blocks 14, 15, and 16 in FIG. 1). Monitoring for an audible alert signal request and possibly intercepting the request is also used in the implementation of other companion features.

If all applications are closed, then the routine ends at step 1106, and otherwise continues to step 1107.

In step 1107, certain sequences of keystroke characters are supplied to the built-in application program in an attempt to quit the active application program. Several tests are used to look for the most common mode of the active application program. If a graphic appears on the display, an ESCAPE key character is delivered to the application program. Otherwise, the loop is aborted if it cannot recognize what is on the display. Then in step 1108, the TESTDSPL routine is executed to determine if the application program quit. If it did quit, then the procedure continues to step 1105, and otherwise continues to step 1109.

In step 1109, the TESTDSPL routine is again executed to determine if there is an unsaved open file currently running. If so, then in step 1110, keystrokes are supplied to the application program to save the file and also keystroke sequences are supplied to try to quit the program again. Again in step 1111, the TESTDSPL routine is invoked to determine if the application program is quit, and if so returns to step 1105. If the application has not quit at step 1111, then twice it has been tried but failed to quit the application program by that point, and the MASS EXIT routine is aborted.

Figure 15:
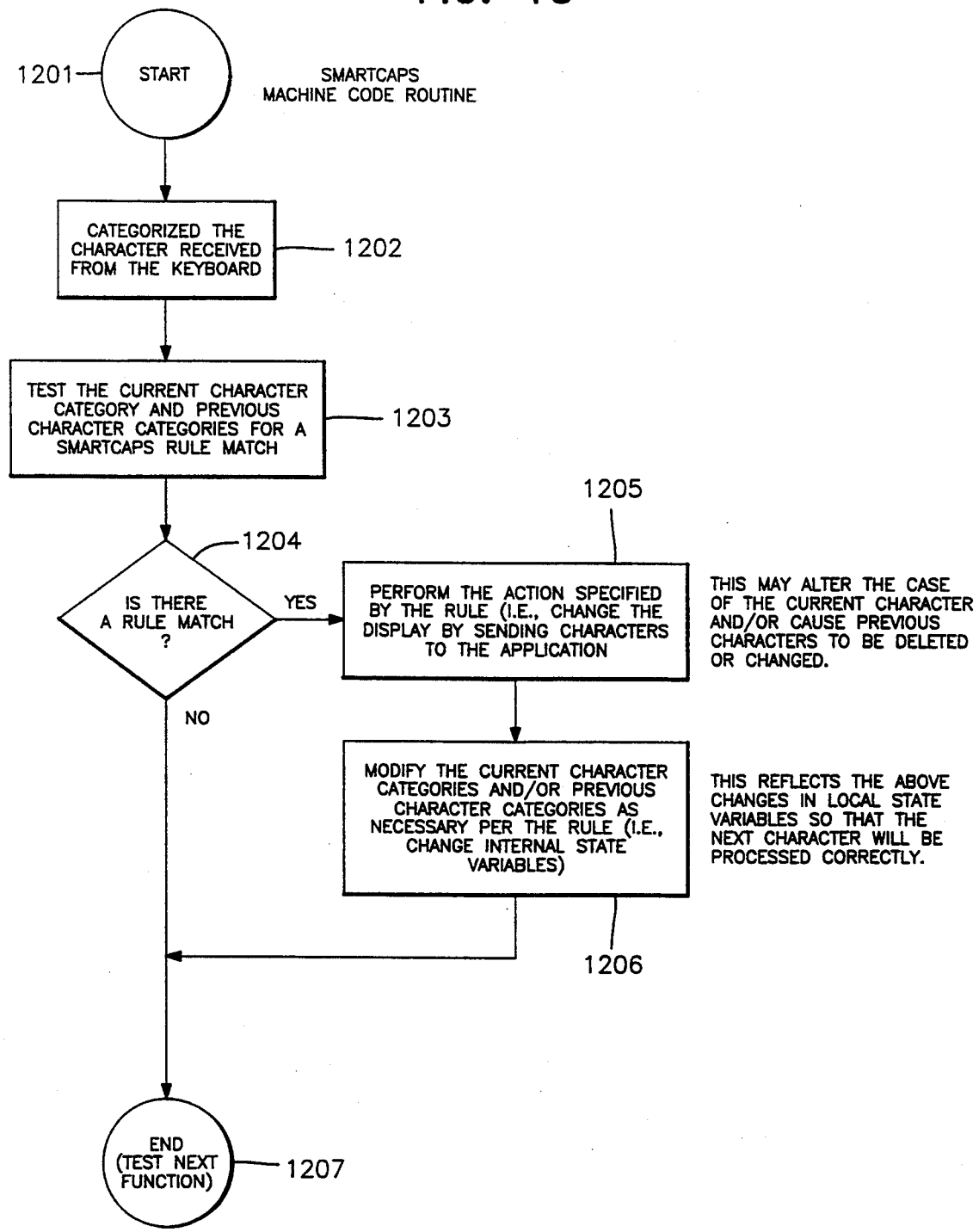
FIG. 15 is a flowchart diagram of a "SMART CAPS" Companion function routine.

FIG. 15 illustrates the SMART CAPS Companion function routine. SMART CAPS is only operative when the Memo text editor application of the 95LX is active. When Memo is active, the user can turn SMART CAPS on and off through a special keystroke sequence (CTRL-STAR). When on, the Companion adds the string "SMART CAPS" to line 1, character position 8 of the display. Consequently, step 1201 is only reached if "Memo" appears on line 1 of the display, as will be determined by a TESTDSPL command. The SMART CAPS routine involves a plurality of rules which are stored in the program, and which are written to perform a specific action depending upon a category of the current character and previous character. A table listing the rules, and examples of applications of the rules, is provided below.

| Rule | Prior keystrokes (in order of entry) | Current keystroke | Action | Example input output text |
|---|---|---|---|---|
| 1 | •end-of-sentence •white-space | •letter | •convert the letter to upper case | word. start word. Start |
| 2 | •white-space •the letter "i" | •white-space or end-of-sentence | •convert the letter "i" to "I" | here i am here I am |
| 3 | •white-space •the letter "i" | •numeral | •convert the letter "i" to "I" and convert the numeral to its associated shifted symbol •if the numeral was "3" or "(," set the current keystroke type to end-of-sentence | when i6m ready when I'm ready |
| 4 | •letter | •numeral | •convert the numeral to its associated shifted symbol •if the numeral was "3"or "(," set the current keystroke type to end-of-sentence otherwise set the type to letter | doesn6t work3 doesn't work? |
| 5 | •letter •end-of-sentence | •numeral | •convert the numeral to its associated shifted symbol •set current keystroke type to end-of-sentence | quote.* quote." |
| 6 | •end-of-sentence •white-space | •letter | •convert the numeral to its associated shifted symbol and convert the letter to upper-case | text. *here we text. "Here we |

-continued

| Rule | Prior keystrokes (in order of entry) | Current keystroke | Action | Example input output text |
|---|---|---|---|---|
| 7 | •numeral<br>•white-space<br>•numeral | •letter | •set the previous keystroke type to white-space<br>•convert the numeral to its associated shifted symbol<br>•set the previous keystroke type to white-space | next 7text<br>next [text |
| 8 | •white-space | •left parenthesis | •set the current keystroke type to white-space | |
| 9 | numeral | •same numeral within short time | •delete the first instance of the numeral and convert the second instance of the numeral to the associate shifted symbol | FIG. G758<br>FIG. G[5] |
| 10 | •white space<br>•letter (or numeral) | •same letter within short time | •delete the first instance of the letter and convert the second instance of the letter to upper case | the ppresident<br>the President |
| 11a | •upper-case letter<br>•letter | •same letter within short time | •delete the first instance of the letter and convert the second instance of the letter to upper case | the ffbbii<br>the FBI |
| 11b | •converted letter from rule 11a, above | •lower-case letter | •restore the converted letter to two lower case letters (The "current keystroke" lower-case letter may not be recognized until after a time delay or another letter is typed.) | aappoint<br>Appoint<br>(not APoint) |
| 12 | •upper-case letter<br>•period<br>•letter | •same letter within short time | •delete the first instance of the letter and convert the second instance of the letter to upper case | uu.ss.aa.<br>U.S.A. |
| 13 | •invocation of rule 1,3,4,5, or 6, above | •same letter or numeral with short time | •ignore the letter or numeral (This prevents a duplicate letter from appearing if the user inadvertently double-clicks.) | here ii am<br>here I am<br>(not: here Ii am) | where:
"end-of-sentence" is a period, question mark, or exclamation point.
"white-space" is one or more spaces, tabs, or carriage returns.
"numeral" is a number from "0" to "9" and the "*" and "(" keys. The shifted symbol associated with the "(" key is an exclamation point.
The initial prior keystroke state is "• end-of-sentence • white-space." Colons, semicolons, and right parentheses are ignored.

In step 1202, a character corresponding to a keystroke received from the keyboard is categorized into one of several categories. There are four character categories:
1. End-of-Sentence—A character which is either a period, question mark or exclamation point.
2. White-Space—A character which is either a space, tab or carriage return.
3. Numeral—A character of "0" to "9", asterisk and left parenthesis.
4. Letter—All letters.

The category of a character is determined by a special set of keystroke tests in the SMART CAPS routine. The TESTKEY and PREVKEY routines in the previously described Companion functions test for a match against only one specified character, whereas the SMART CAPS logic must test against a range of characters (e.g., "a" to "z" and "A" to "Z").

In step 1203, the current character category and previous character category are compared with rules for a SMART CAPS rule match. In step 1204, it is determined whether there is a rule match. If so, then in step 1205, the action specified by the rule is performed. This action may involve altering the case of the current character and/or causing the previous characters to be deleted or changed.

Step 1205 modifies the character sent or the characters previously sent to the application. This affects what the user sees. Previously sent characters are modified by "recalling" them. The Companion accomplishes this by issuing backspace characters to the application to delete the characters, and then the Companion sends in their place the desired characters instead. Step 1206 changes the category values stored in the Companion's memory so as to properly keep track of what was done since any character and character category changes may affect the decisions made for future characters. This step does not affect what the user sees; it only affects internal Companion status.

If no rule match is found, then in step 1207 this routine terminates.

Figure 16:
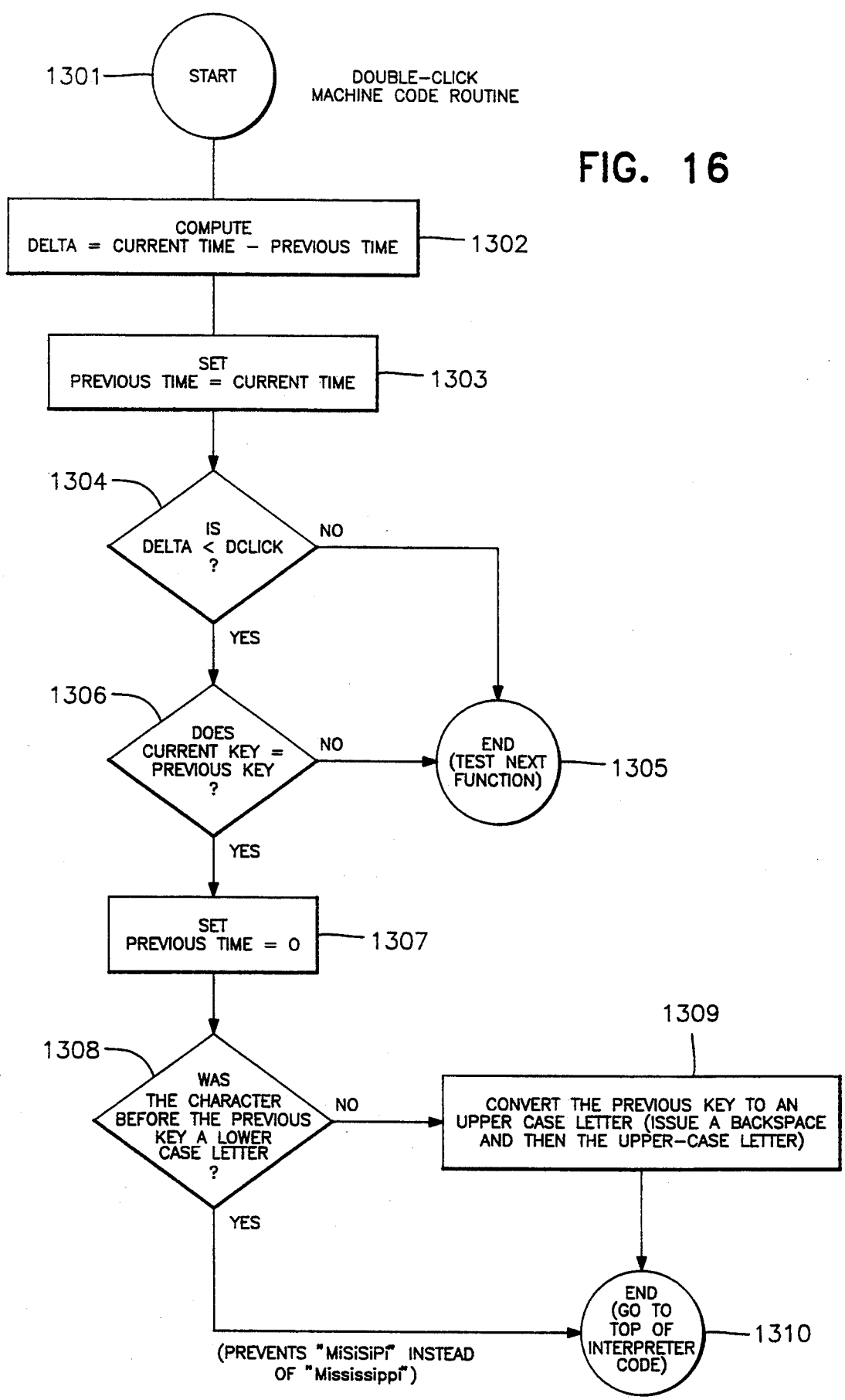
FIG. 16 is a flowchart diagram of a "DOUBLE-CLICK" Companion function routine.

FIG. 16 illustrates the logic flow of the DOUBLE-CLICK Companion function routine. This routine is designed to permit a user to obtain a shifted version of a key by pressing that key twice within a predetermined period of time. In step 1302, the time difference "delta" between the time at which the current keystroke (a variable "current time") is hit and the time at which the previous keystroke (a variable called "previous time") is pressed is computed. Delta and previous time are local variables in the function routine.

In step 1303, the previous time is set to the current time for the next keystroke double-click comparison. Then in step 1304, delta is compared with a user-specified time interval "dclick", which is a preset local variable in the routine. This time interval may be, for example, 0.3 seconds. If delta is not less than dclick, then this function routine ends. If step 1305 is reached and the keystroke is for a letter, the unshifted version of that letter will be displayed.

However, if delta is less than dclick, then in step 1306, machine-code routines that are part of the DOUBLE-CLICK logic are invoked to determine if the current keystroke is the same as the previous keystroke. These machine-code routines are similar to the TESTKEY and PREVKEY routines. If the keystrokes are different, then the routine ends. If so, then in step 1307, previous time is set to zero, and in step 1308, the previous character is tested to determine if it is a lower case letter. If the answer to the test in step 1308 is yes, then the previous keystroke character is not capitalized and the routine ends at step 1310. Otherwise, in step 1309, the character for the upper case version of the previous keystroke is supplied to the built-in application program, thus converting that character from its unshifted version to its shifted version.

Figure 17:
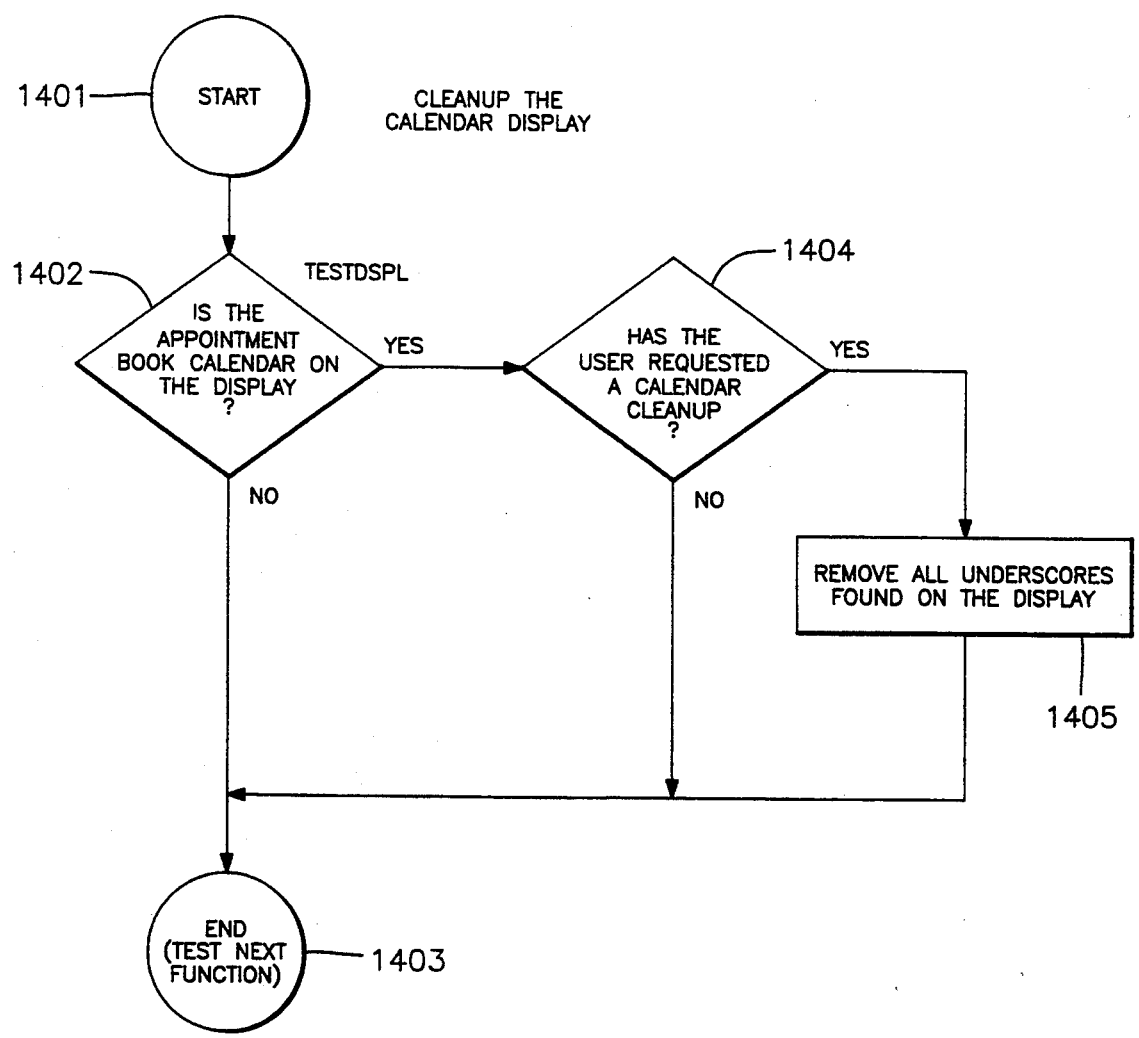
FIG. 17 is a flowchart diagram of a "CALENDAR CLEANUP" Companion function routine.

FIG. 17 illustrates the CALENDAR CLEANUP display routine. At step 1402, the TESTDSPL routine is invoked to determine whether the appointment book calendar is on the display. If so, then in step 1404, a test is made of the user configuration file to determine whether the user has requested that the calendar cleanup feature be made active. If it has been made active, then in step 1405, a series of commands are executed to remove all underscores found on the display.

Figure 18:
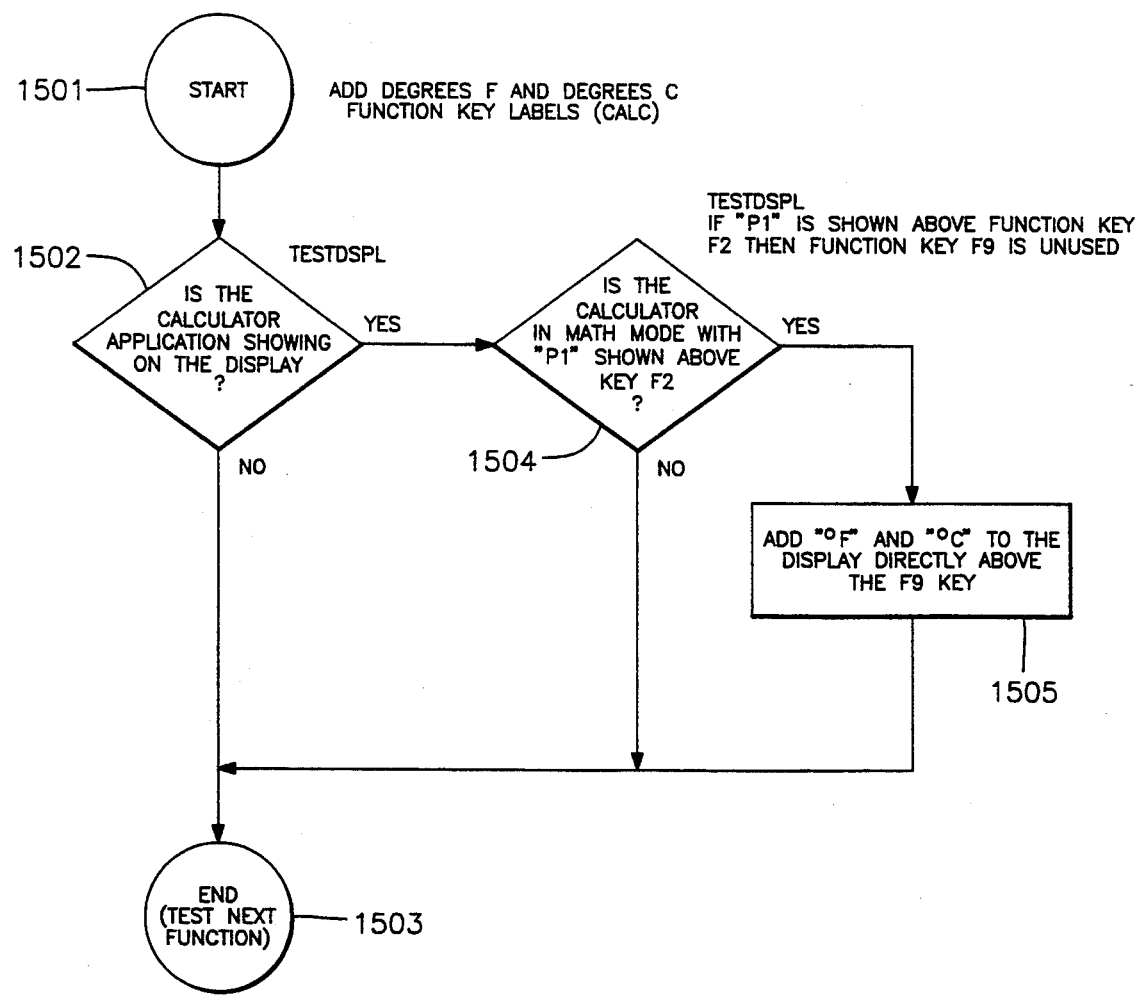
FIG. 18 is a flowchart diagram of a "FAHRENHEIT-CELSIUS CONVERSION DISPLAY" Companion function routine.

FIG. 18 illustrates the routine for displaying the feature associated with the FAHRENHEIT-CELSIUS ("° F. to ° C.") conversion function. This routine is just an example of the many routines that may be provided to display a feature associated with a Companion function. This routine is designed to merely indicate on the display screen that the conversion function is available when the active application program is the calculator. In step 1502, the TESTDSPL routine is invoked to determine whether the calculator application is on the display. If so, then in step 1504, the TESTDSPL routine is invoked again to determine if the calculator is in the math mode with a "PI" shown above the function key F2. The assignments of the function keys described in conjunction with this feature are specific to the HP 95LX. The Companion makes use of the built-in assignment of function key F2, in this example, to determine the mode of the application program ("program mode"). If "PI" is displayed above the function key F2, then the function key F9 is used for designating the key to trigger the Fahrenheit-Celsius conversion function. In step 1505, "° F." and "° C." are added to the display directly above the F9 key. Again, this is to inform the user that the Fahrenheit-Celsius conversion function may be executed by pressing the F9 function key.

It is to be understood that the Companion may perform many other functions, and only some of those are described in detail herewith, for the purposes of simplicity. The following is a listing of other features which the Companion may also perform, but for which detail explanations are not made:

1. Add default directories for the built-in applications, particularly the Memo text editor.
2. Improve the "look-and-feel" of the computer by making the various applications appear more consistent in how they operate, such as saving a file and quitting from a file.
3. Allow the names of the three fields of phone book cards to be user-defined.
4. Automatically scan for a file in the Filer application program by typing only a few characters of a file name.
5. Link certain application programs together by allowing a file to be highlighted in the Filer and then easily opened without having to retype the name of the file.
6. Improve the Memo text editor application by adding numerous features, such as, "find & replace", "find first", "find last", "circular find", "edit again", and a change case function.
7. Add features to the computer that were omitted or overlooked in the original design, such as, temperature conversions in the calculator, "paste" to the phone card editor, and user-defined labels to the user macro keys.
8. Extend appointments audible alarm for up to eight minutes in the appointment application program.
9. Prevent unnecessary power drain by keeping the serial port powered-down when operating on batteries.

The above description is intended by way of example only and is not intended to limit the present invention in any way except as set forth in the following claims.

I claim:

1. A method for modifying and enchancing functions of a computer having a ketboard, a display for displaying information in accordance with display data provided to the display, and a plurality of stored application programs built into the computer and responsive to a keystroke character stream, the method comprising the steps of:

(a) monitoring the display memory to determine the display data provided thereto;
   (b) determining, from the display data, the application program that is active;
   (c) waiting for a key to be pressed on the keyboard and then determining the keystroke character if a key is pressed;
   (d) examining a series of keystrokes; and
   (e) determining, from the display data and the series of keystrokes, (i) whether the last determined keystroke is to be delivered to the application program without change, (ii) whether additional or different characters are to be inserted into the character stream to be delivered to the application program, or (iii) whether the last determined keystroke is to be dumped and not delivered to the application program, said determining step comprising searching through a set of stored commands to determine if there is a stored command designated for execution in the active application program based on the last determined keystroke, previous keystroke and said display data wherein said set of stored commands includes commands for changing a character represented by a particular keystroke based on double-clicking of the corresponding key to display the shifted version of that key, comprising the steps of:

determining the time difference between the pressing of two consecutive keystrokes:
   comparing said time difference with a predetermined threshold;
   comparing the last determined keystroke with the previous keystroke if the time difference is less than a predetermined threshold;
   determining if the previous keystroke is an unshifted character; and
   returning a keystroke character without striking a key to the application program for converting the previous keystroke to its corresponding shifted keystroke character if it is determined that the previous keystroke is an unshifted character.

2. The method of claim 1, and further comprising the step of creating a user configuration file including commands to activate, deactivate, or control parameters of said set of stored commands, and receiving data through the keyboard representing said user configuration file.

3. The method of claim 1, wherein said set of stored commands further includes instructions for performing a fast save and exit function comprising the steps of:
   determining whether to quit the active application program and save any open files, based on the last determined keystroke and the previous keystroke;
   returning without striking a key a keystroke character stream to the active application program indicating the quitting of the active application program if the particular keystroke sequence is found in the current keystroke and the previous keystroke;

determining if a particular line of the display information provides a particular user prompt asking the user to save changes before exiting the file returning without striking a key a character stream to the active application program for controlling the termination of the active application program and saving said open files.

4. The method of claim 1, wherein said set of stored commands further includes instructions for performing a mass exit function comprising the steps of:

determining if two keystrokes represent a particular keystroke sequence indicative of an exit of all of the opened application programs based on the last determined keystroke and the previous keystroke;

returning a character stream without striking a key on the keyboard to quit the active application program;

determining if the active application program has been quit based on the display data;

determining if there is an unsaved open file in the application program if the application program did not quit;

returning a character stream without striking a key for saving any unsaved open file; and repeating both steps of returning and both steps of determining until all application programs are quit.

5. The method of claim 4, wherein said set of stored commands includes a plurality of sequences of instructions for saving any open file, and quitting each of the application programs which may run on the computer, the particular sequence of instructions for quitting the application programs being selected on the basis of the display data.

6. The method of claim 1, further comprising the step of:

monitoring for an audible alert signal request generated by an application program.

7. The method of claim 6, further comprising the step of:

intercepting the audible alert signal request generated by an application program so as to prevent the request from causing an audible alert signal.

8. The method of claim 1 wherein said set of stored commands further includes:

instructions defining a plurality of character categories to which a keystroke character is assigned and defining a plurality of rules assigned to categories of consecutive keystroke characters;

determining the category of each character received by a keystroke from the keyboard;

determining the rule corresponding to categories of consecutive keystroke characters;

returning without striking a key, a keystroke character or keystroke characters to said application program to modify one or more consecutive keystroke characters as specified by the corresponding rule.

* * * * *